(12) United States Patent
Tokuda

(10) Patent No.: US 8,686,993 B2
(45) Date of Patent: Apr. 1, 2014

(54) IMAGE PROCESSING FOR CONTROLLING DISPARITY IN 3D IMAGES

(75) Inventor: Takahiro Tokuda, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 12/956,227

(22) Filed: Nov. 30, 2010

(65) Prior Publication Data

US 2011/0175907 A1 Jul. 21, 2011

(30) Foreign Application Priority Data

Jan. 18, 2010 (JP) ................................ 2010-008132

(51) Int. Cl.
*G06T 15/00* (2011.01)
(52) U.S. Cl.
USPC ......................................................... 345/419
(58) Field of Classification Search
None
See application file for complete search history.

(56) References Cited

U.S. PATENT DOCUMENTS

| | | | |
|---|---|---|---|
| 6,791,598 B1* | 9/2004 | Luken et al. | 348/36 |
| 2001/0033327 A1* | 10/2001 | Uomori et al. | 348/47 |
| 2004/0252205 A1* | 12/2004 | Onoda | 348/231.3 |
| 2005/0046626 A1* | 3/2005 | Yoda et al. | 345/419 |
| 2009/0167873 A1* | 7/2009 | Sakaue et al. | 348/207.2 |
| 2009/0167923 A1* | 7/2009 | Safaee-Rad et al. | 348/345 |
| 2011/0025825 A1* | 2/2011 | McNamer et al. | 348/46 |

FOREIGN PATENT DOCUMENTS

JP 4-35491 2/1992

* cited by examiner

*Primary Examiner* — Edward Martello
(74) *Attorney, Agent, or Firm* — Oblon, Spivak, McClelland, Maier & Neustadt, L.L.P.

(57) ABSTRACT

An image processing apparatus includes: a disparity setting unit that sets disparity between left-eye and right-eye images for a 3D image based on a manipulation from a manipulation unit that allocates a value to a depth direction of a 2D image; and a 3D image creating unit that creates data on the left-eye and right-eye images in which a corresponding object is arranged in positions separated by the disparity set by the disparity setting unit.

15 Claims, 33 Drawing Sheets

FIG. 1
FIG. 2
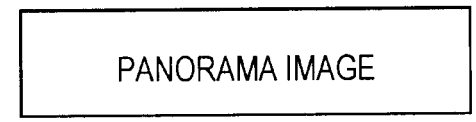
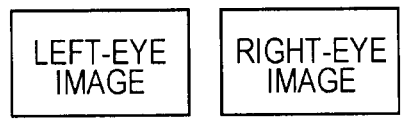

FIG. 5
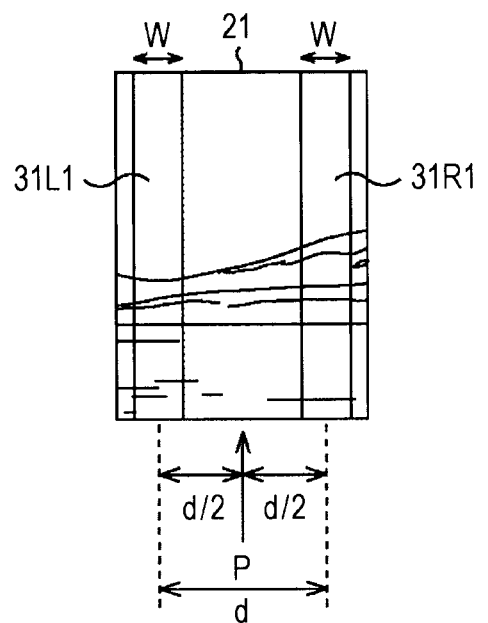
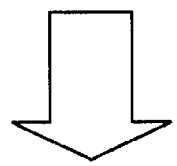

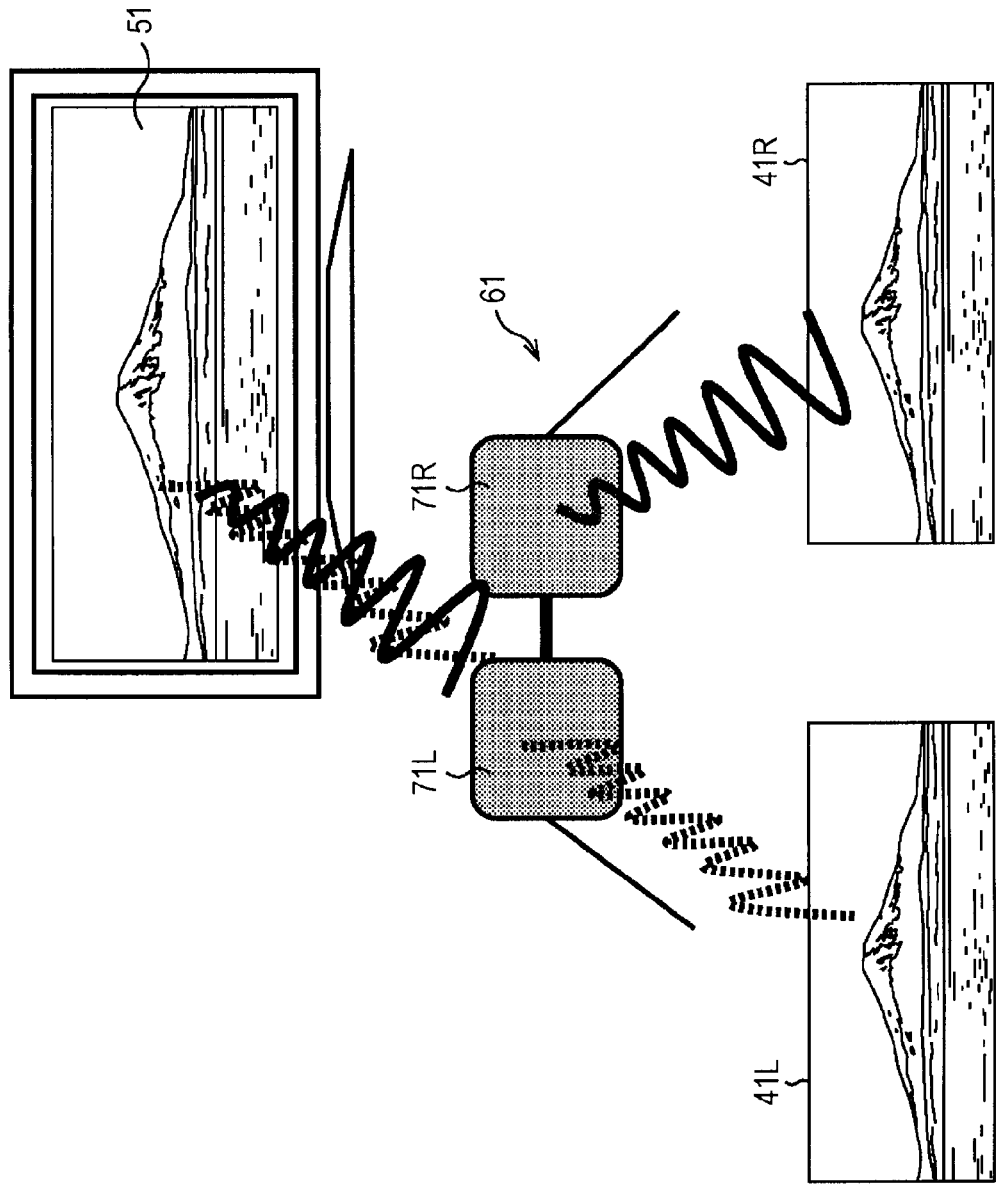

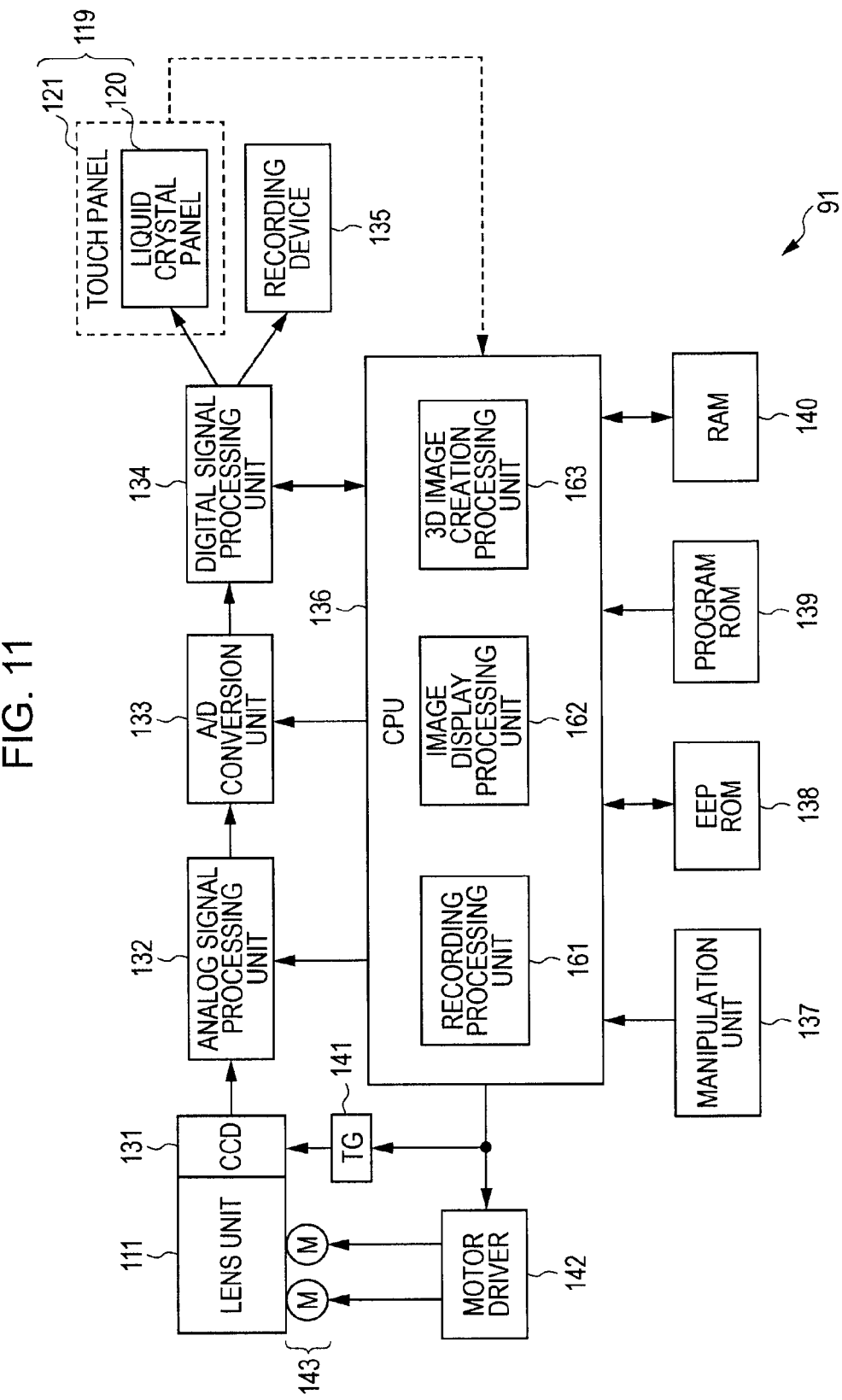

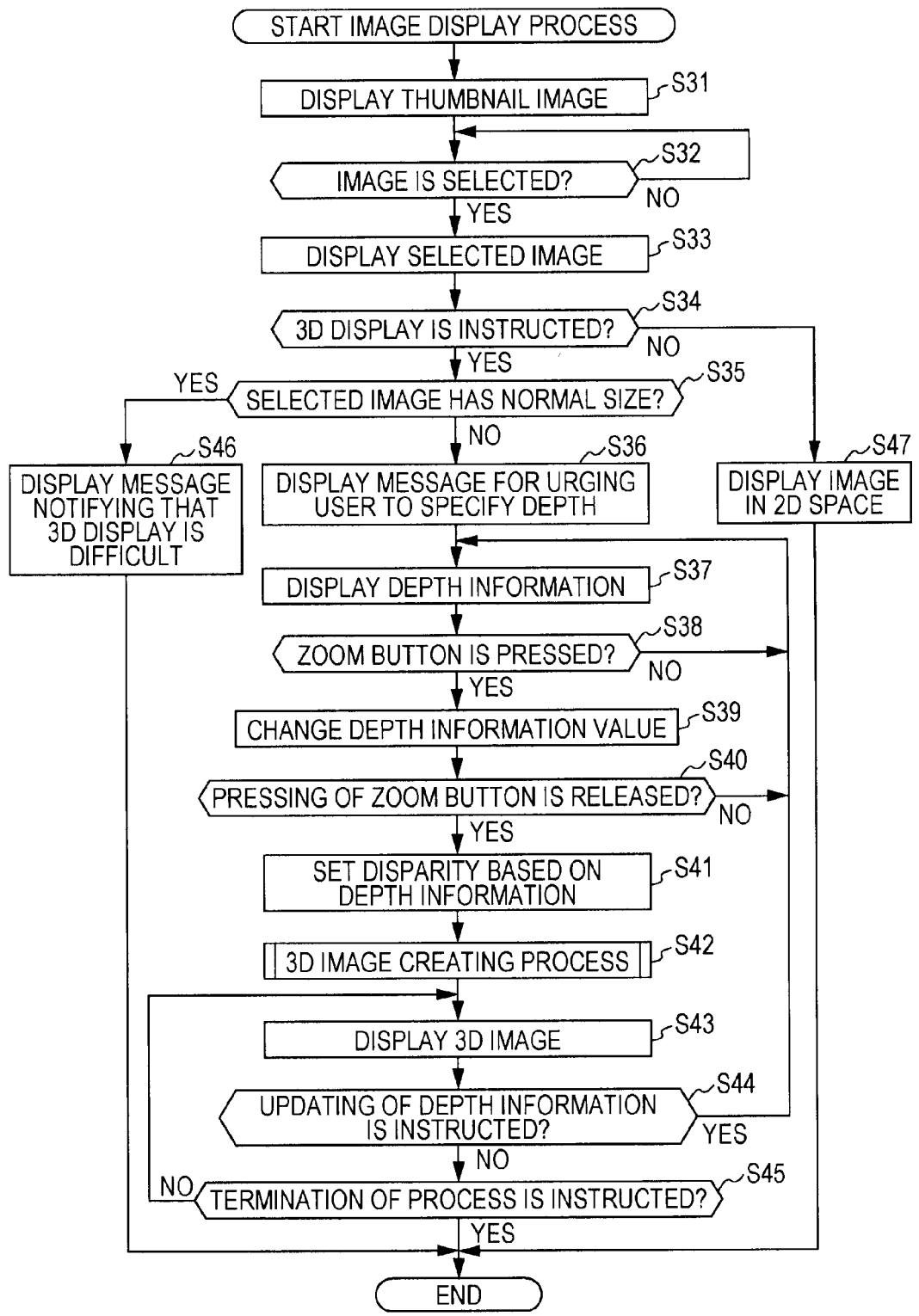

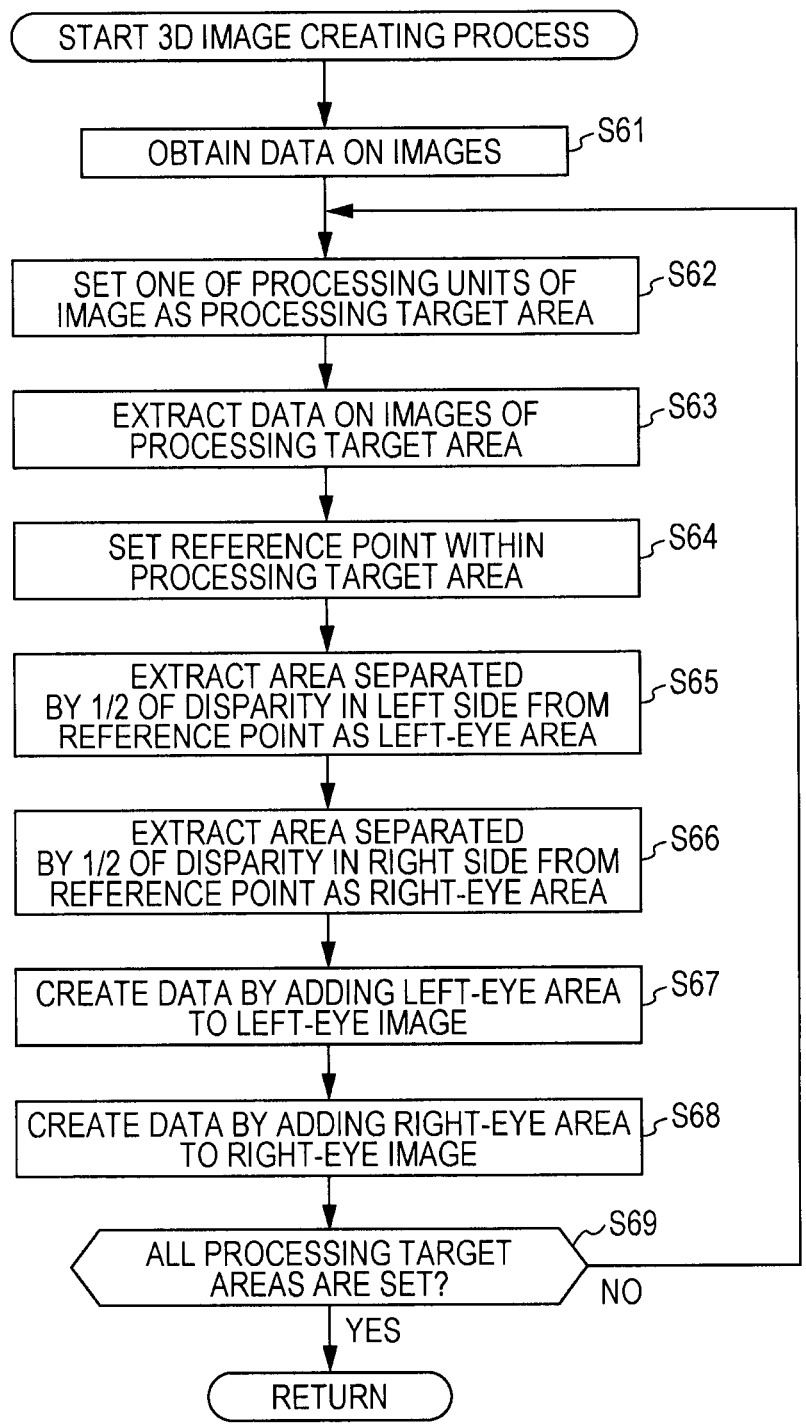

| DISPARITY | LEFT-EYE IMAGE | RIGHT-EYE IMAGE |
|---|---|---|
| 1 | IMAGE G2 | IMAGE G3 |
| 2 | IMAGE G2 | IMAGE G4 |
| 3 | IMAGE G1 | IMAGE G4 |
| 4 | IMAGE G1 | IMAGE G5 |
| ⋮ | ⋮ | ⋮ |

FIG. 26

| DISPARITY | LEFT-EYE IMAGE | RIGHT-EYE IMAGE |
|---|---|---|
| 1 | IMAGE G2 | IMAGE G3 |
| 2 | IMAGE G2 | IMAGE G4 |
| 3 | IMAGE G2 | IMAGE G5 |
| ⋮ | ⋮ | ⋮ |
| m | IMAGE G2 | IMAGE GN |
| m + 1 | IMAGE G1 | IMAGE GN |

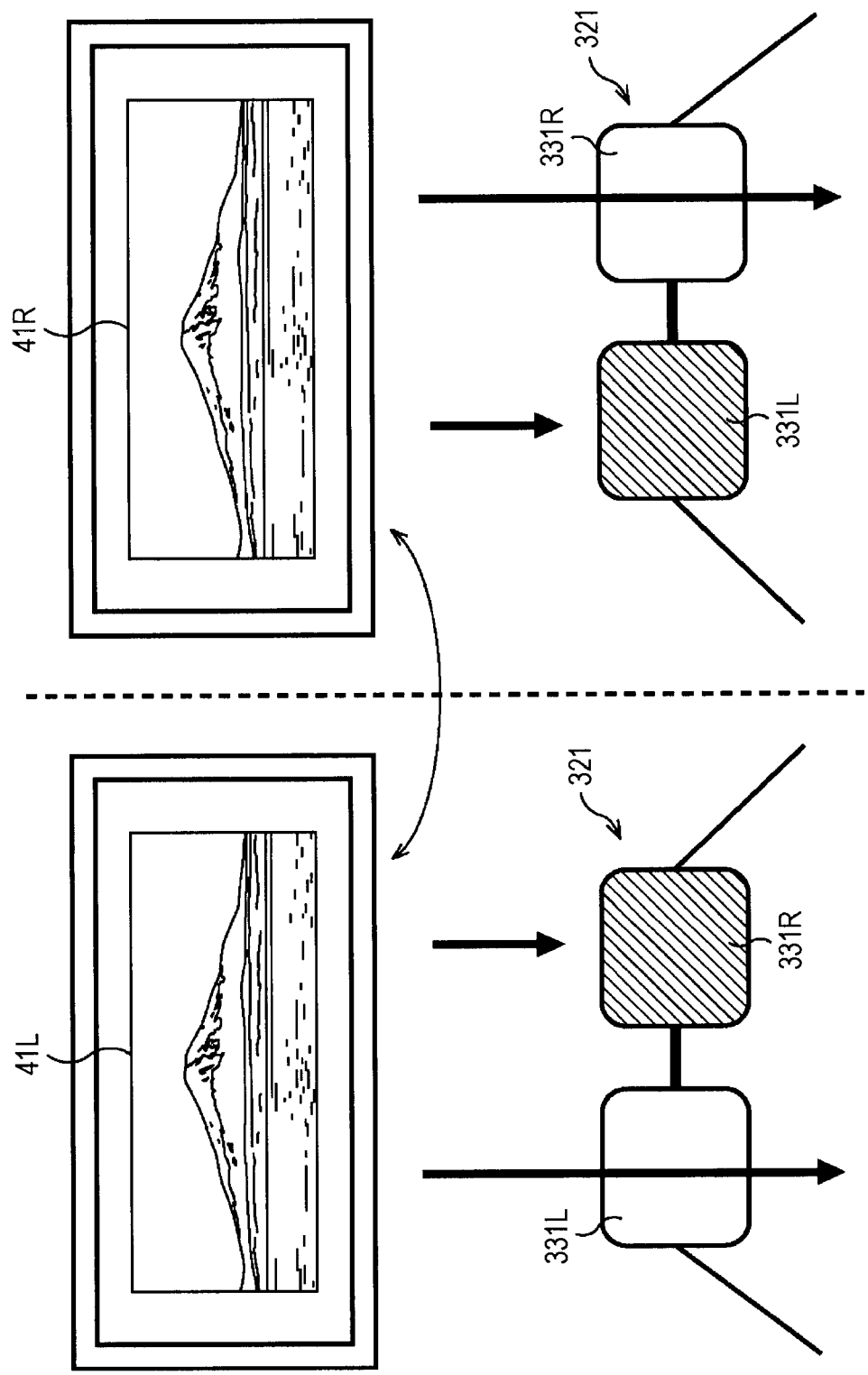

IMAGE PROCESSING FOR CONTROLLING DISPARITY IN 3D IMAGES

BACKGROUND OF THE INVENTION

1. Field of the Invention

The present invention relates to an image processing apparatus, an image processing method, and a program, and more particularly, an image processing apparatus, an image processing method, and a program capable of adjusting a depth-height degree of an object displayed in 3D space by a user's intuitive manipulation.

2. Description of the Related Art

In the related art, there is a technique of displaying a subject in 3D space using left-eye and right-eye images (hereinafter, referred to as a 3D image) obtained by making a shot of the subject for 3D (3-dimensional) display. Hereinafter, an object picture included in the image will be referred to as an object, including the case where it is positioned in the foreground and the case where it is positioned in the background.

A method of adjusting the depth-height degree of the object to be displayed in 3D space to display a 3D image has been proposed (e.g., refer to Japanese Unexamined Patent Application Publication No. 4-35491).

SUMMARY OF THE INVENTION

When a user adjusts the depth-height degree of the object displayed in 3D space, the user may feel a sense of unease at manipulation because the user is familiar with a 2D image display of the related art.

In this regard, it is desirable to allow a user to adjust the depth-height degree of the object displayed in 3D space through an intuitive manipulation.

According to an embodiment of the invention, there is provided an image processing apparatus including: a disparity setting unit that sets disparity between left-eye and right-eye images for 3D image based on a manipulation from a manipulation unit that allocates a value to a depth direction of a 2D image; and a 3D image creating unit that creates data on the left-eye and right-eye images in which a corresponding object is arranged in positions separated by the disparity set by the disparity setting unit.

The manipulation unit may include a hardware button that allocates a predetermined manipulation to the depth direction or a software button displayed on a touch panel.

A variable range of the disparity may correspond to an operable range of the manipulation unit, and the disparity setting unit may set the disparity having a degree corresponding to an operable position within the operable range of the manipulation unit.

The image processing apparatus may further include an imaging unit that obtains data on a panorama image by making a shot of a subject, and the 3D image creating unit may create data on the left-eye and right-eye images using the panorama image data obtained by the imaging unit.

The image processing apparatus may further include an imaging unit that obtains data from a plurality of images by making shots of a subject at constant intervals while relatively moving in an approximately horizontal direction with respect to the subject in response to a single shot instruction, and the 3D image creating unit may create data on the left-eye and right-eye images using the data on a plurality of images obtained by the imaging unit.

The disparity setting unit may set disparity between foreground objects synthesized with at least a part of areas of the left-eye and right-eye images as disparity between the left-eye and right-eye images, and the 3D image creating unit may create data on the left-eye image by synthesizing data on a foreground image where the foreground object is arranged in a predetermined position and data on a left-eye background image and create data on the right-eye image by synthesizing data on the foreground image where the foreground object is arranged in a position displaced from the predetermined position by the disparity with data on a right-eye background image.

According to another embodiment of the invention, there are provided an image processing method and a program corresponding to the image processing apparatus according to an embodiment of the invention.

According to another embodiment of the invention, there are provided an image processing method and a program including the steps of: setting disparity between left-eye and right-eye images for a 3D image based on a manipulation of a manipulation unit that allocates a value to a depth direction of a 2D image; and creating a 3D image by creating data on the left-eye and right-eye images in which a corresponding object is arranged in positions separated by the disparity set through the step of setting the disparity.

As described above, according to the present invention, it is possible to adjust the depth-height degree of the object displayed in 3D space by a user's intuitive manipulation.

BRIEF DESCRIPTION OF THE DRAWINGS

FIG. 1 is a diagram illustrating a first creating method of creating a 3D image.

FIG. 2 is a diagram illustrating a second creating method of creating a 3D image.

FIG. 5 is a diagram illustrating a method of creating a 3D image from a panorama image.

FIG. 9 is a diagram illustrating an example of 3D display.

FIG. 11 is a diagram illustrating an internal configuration example of an imaging apparatus.

FIG. 16 is flowchart illustrating an example of the image display process.

FIG. 17 is a flowchart illustrating an example of the 3D image creation process.

FIG. 26 is a diagram illustrating another example of the data structure of the matching relationship table.

FIG. 34 is a diagram illustrating another example of 3D display.

DESCRIPTION OF THE PREFERRED EMBODIMENTS

Outline of Method of Creating 3D Image

According to embodiments of the present invention, a 3D image is displayed. In this regard, in order to facilitate understanding of the embodiments of the present invention, an outline of a method of creating a 3D image including left-eye and right-eye images will be described before describing the embodiments of the present invention. The method of creating a 3D image can be generally classified into the following three methods. Hereinafter, these are referred to as first, second, and third creating methods.

FIG. 1 illustrates a first creating method of creating a 3D image.

According to the first creating method, an imaging apparatus having two lenses is used. Specifically, according to the first creating method, a user or the like makes a single shot by holding the imaging apparatus and approximately horizontally arranging both lenses. Then, data on the left-eye image are created by the light transmitting through the lens located in the left side, and data on the right-eye image are created by the light transmitting through the lens located in the right side.

Each of the left-eye and right-eye images created as described above contains the corresponding object at the positions separated from each other based on the distance between two lenses of the imaging apparatus. Hereinafter, a difference (i.e., distance) between the approximately horizontally displaced positions of the corresponding object contained in each of the left-eye and right-eye images will be referred to as "disparity." As the disparity increases, the depth of the object displayed in 3D space increases, i.e., the depth-height degree increases. Therefore, the disparity having such a characteristic may be used as a parameter defining the depth-height degree of the object displayed in 3D space.

However, according to the first creating method, since the distance between two lenses is fixed, the disparity is also fixed. As a result, it is difficult to variably set the depth-height degree of the object.

FIG. 2 illustrates a second creating method of creating a 3D image.

According to the second creating method, data on a single panorama image are created by making a single shot, and data on the left-eye and right-eye images are created from the data on such a panorama image by arranging the corresponding object at the positions separated by a predetermined value of disparity. Here, the "panorama image" refers to an image having a long size in the horizontal direction obtained by making a shot of the subject using a wide view angle in comparison with a normal size image obtained by making a shot of the subject using a normal view angle. In the second creating method, the disparity may be variably set by a user. In other words, the second creating method is a method in which a user can variably set the depth-height degree of the object displayed in 3D space. In addition, the second creating method will be described in more detail below.

Figure 3:
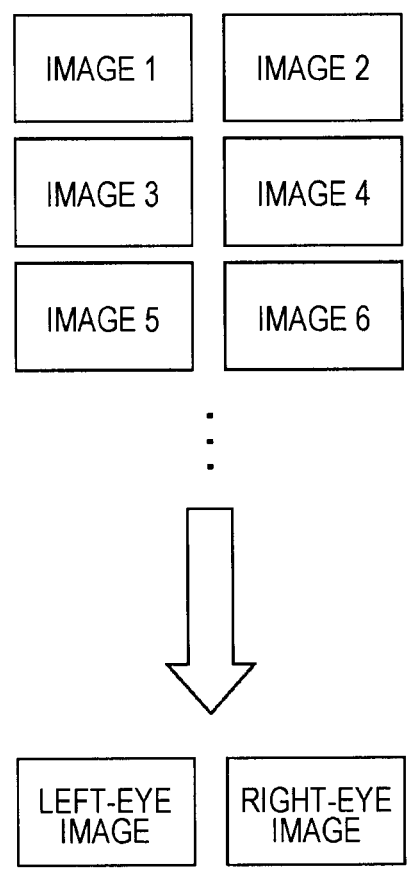
FIG. 3 is a diagram illustrating a third creating method of creating a 3D image.

FIG. 3 illustrates a third creating method of creating a 3D image.

According to the third creating method, data on two images are selected from data on a plurality of images obtained by making shots at constant intervals (hereinafter, referred to as a continuous shot) while relatively moving the imaging apparatus with respect to the subject in an approximately horizontal direction through a single shot instruction, and the two selected images are employed as the left-eye and right-eye images. As a result, the two images selected as each of the left-eye and right-eye images include the corresponding objects at the positions separated by the disparity corresponding to the movement distance of the imaging apparatus. Therefore, a user can change the disparity by changing a combination of the two selected images. In other words, according to the third creating method, a user can variably set the depth-height degree of the object displayed in 3D space. In addition, the third creating method will be described in more detail below.

Hereinafter, examples regarding adjustment of the depth-height degree of the object of the 3D image using the second and third creating methods will be described as the first and second embodiments, respectively. In addition, an example of adjustment of the depth-height degree of the stamp image as a 3D image will be described as the third embodiment. While details will be described below, the "stamp image" refers to an image synthesized with and displayed on at least a part of the area of the background image.

Hereinafter, three embodiments will be described in the following sequence.

1. First Embodiment: an example of adjustment of the depth-height degree of the object of the 3D image created from the panorama image;

2. Second Embodiment: an example of adjustment of the depth-height degree of the object of the 3D image created from a plurality of images obtained through a continuous shot; and 3. Third Embodiment: an example of adjustment of the depth-height degree of the stamp image as a 3D image

1. First Embodiment

Method of Creating 3D Image from Panorama Image

Here, in order to facilitate understanding of the first embodiment, the second creating method, i.e., the method of creating a 3D image from a panorama image will be described in detail before describing the configuration of the image processing apparatus according to the first embodiment. Then, an example of displaying the corresponding 3D image created using the second creating method will be described.

FIGS. 4 to 7 illustrate a method of creating a 3D image from a panorama image.

Figure 4:
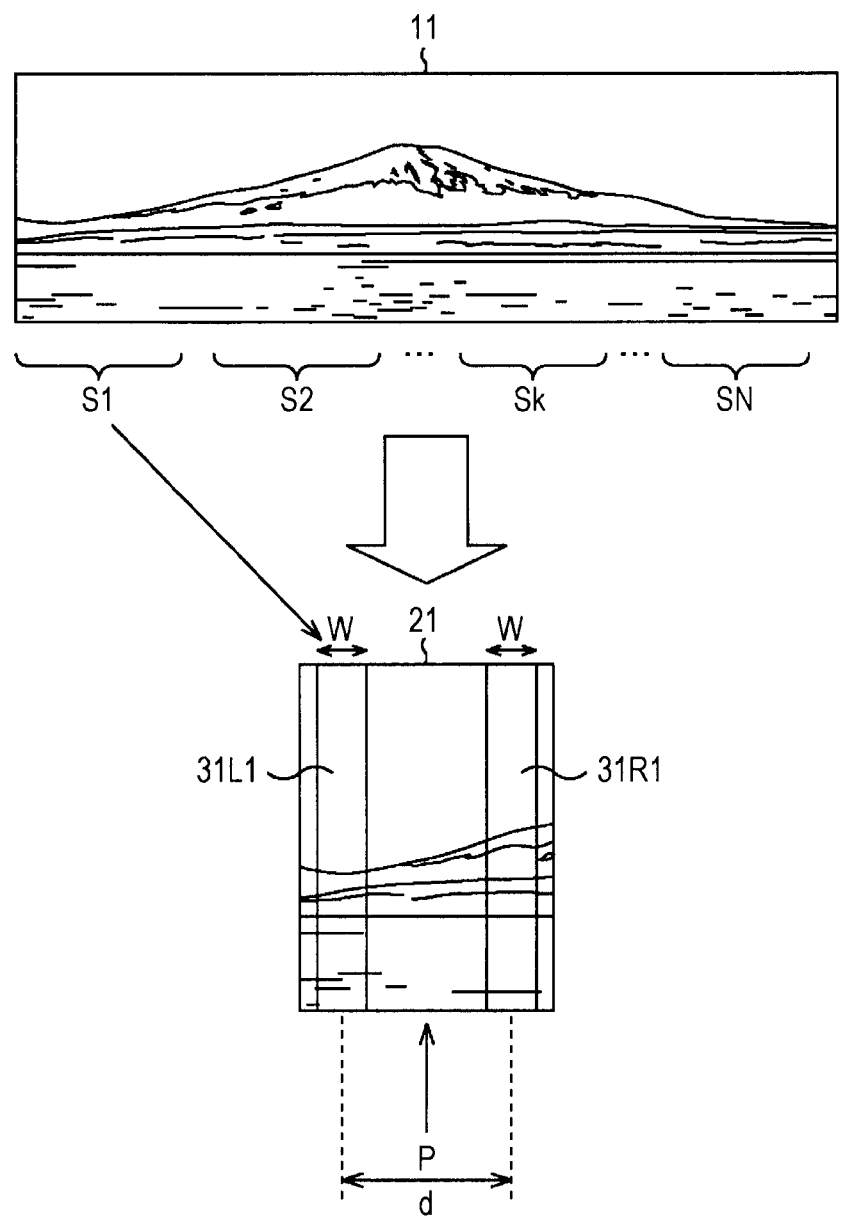
FIG. 4 is a diagram illustrating a method of creating a 3D image from a panorama image.

Referring to FIG. 4, first, panorama image data 11 are classified into a plurality of processing units Sk (where, k is any integer vale selected from 1 to N, and N is any integer value equal to or larger than 2). Here, it is assumed that the size of the processing unit Sk is represented by the size of the horizontal direction (the number of pixels in the horizontal direction). In this case, the processing unit Sk is divided to have a constant size.

As a result, out of a plurality of processing units S1 to SN divided from the panorama image data 11, first, the processing unit S1 is set as the processing target area 21, and a series of the following processes are executed for the processing target area 21.

That is, a predetermined position in the horizontal direction of the processing target area 21 is set as a reference point P. The left and right areas separated by the same distance from the reference point P are extracted as the left-eye area 31L1 and the right-eye area 31R1, respectively. Specifically, the distance between the left-eye area 31L1 and the right-eye area 31R1 corresponds to the disparity d, as shown in FIG. 5, the area having a width w separated from the reference point P in the left side by a distance of a half of the disparity d (=d/2) is extracted as the left-eye area 31L1. Similarly, the area having a width w separated from the reference point P in the right side by a distance of a half of the disparity d (=d/2) is extracted as the right-eye area 31R1. The extracted left-eye area 31L1 and the right-eye area 31R1 are set as a part of the left-eye and right-eye images, respectively.

In this manner, a series of the aforementioned processes are executed by setting the processing unit S1 as the processing target area 21, and, in turn, a series of the aforementioned processes are executed by setting the processing unit S2 as the processing target area 21. That is, in this case, each of the left-eye area 31L2 and the right-eye area 31R2 is extracted from the processing target area 21 which is the processing unit S2. The extracted left-eye area 31L2 is added to the right side of the left-eye area 31L1 which is included in a part of the current left-eye image. As a result, the left-eye areas 31L1 and 31L2 are set as a part of a new left-eye image. Similarly, the extracted right-eye area 31R2 is added to the right side of the right-eye area 31R1 included in a part of the current right-eye image. As a result, the right-eye areas 31R1 and 31R2 are set as a part of a new left-eye image.

Figure 6:
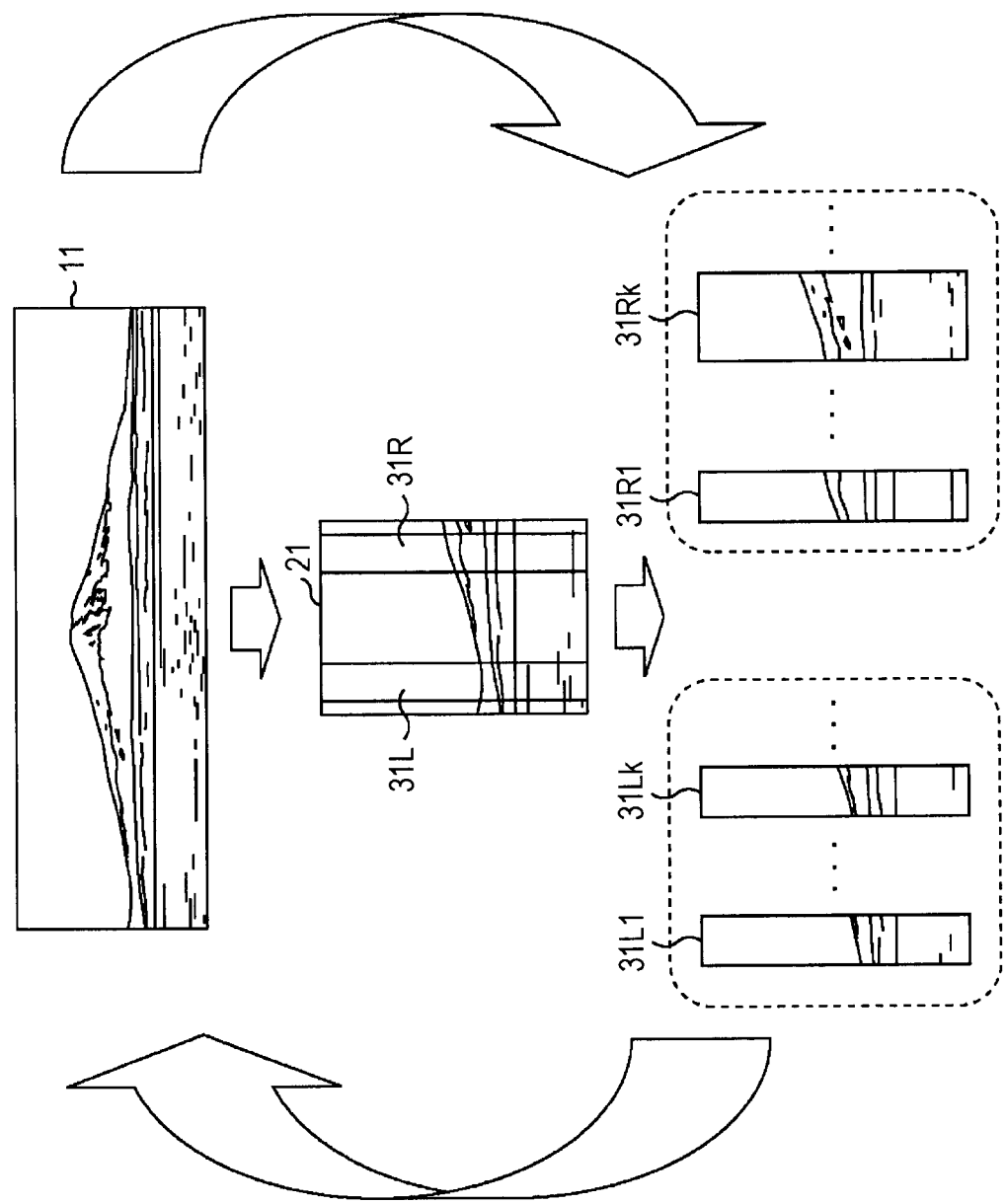
FIG. 6 is a diagram illustrating a method of creating a 3D image from a panorama image.

Hereinafter, the processing units S3 to SN are sequentially selected as a processing target area 21, and a series of the aforementioned processes are repeatedly executed. In other words, as shown in FIG. 6, if the processing unit Sk (k is any integer value selected from 3 to N) is set as the processing target area 21, each of the left-eye area 31Lk and the right-eye area 31Rk is extracted from the processing target area 21 which is the processing unit Sk. The extracted left-eye area 31Lk is added to the right side of the left-eye areas 31L1 to 31L(k−1) which are included in a part of the current left-eye image. As a result, the left-eye areas 31L1 to 31Lk are set as a part of a new left-eye image. Similarly, the extracted right-eye area 31Rk is added to the right side of the right-eye area 31R1 to 31R(k−1) which is a part of the current right-eye image. As a result, the right-eye areas 31R1 to 31Rk are set as a part of a new right-eye image.

Figure 7:
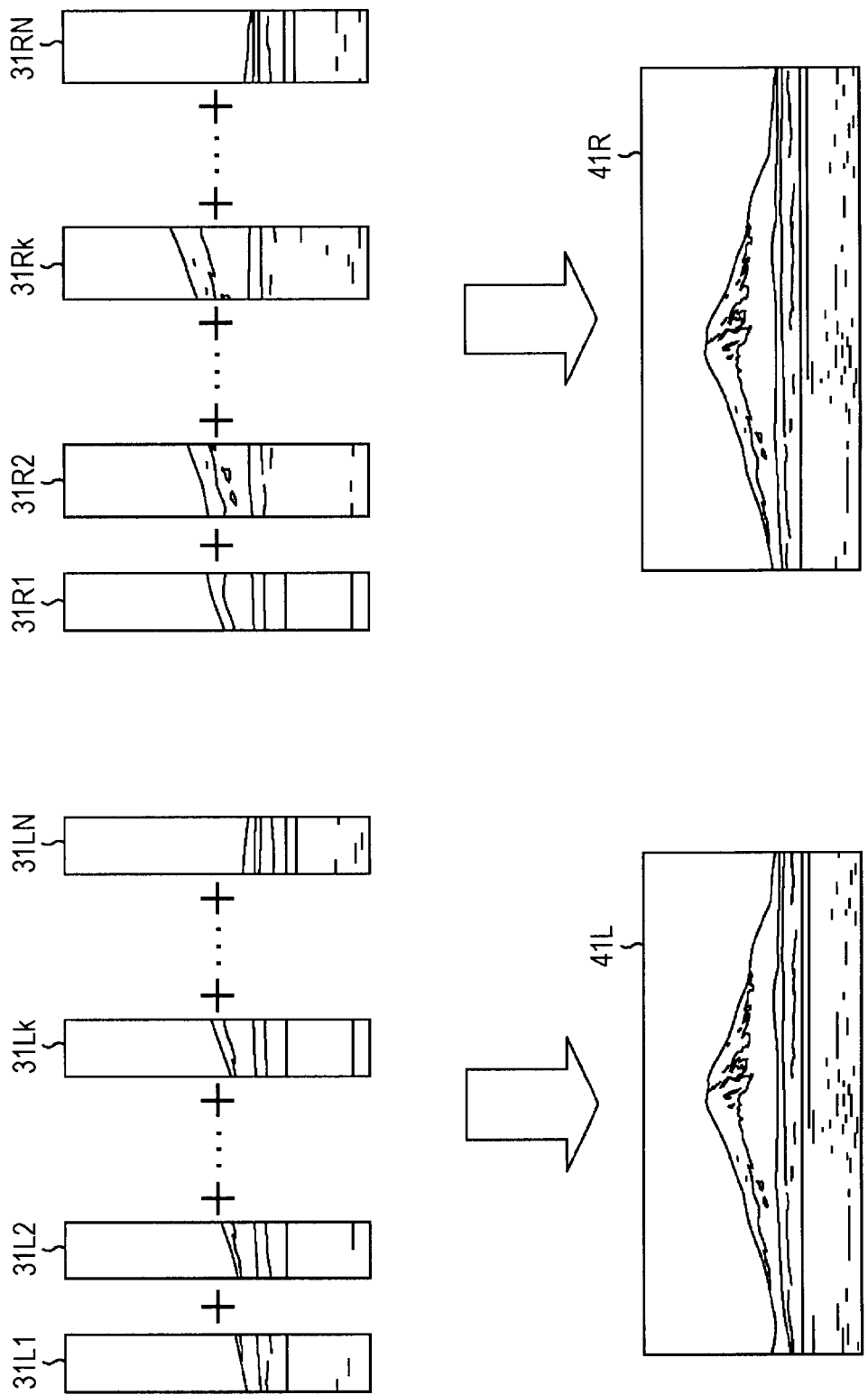
FIG. 7 is a diagram illustrating a method of creating a 3D image from a panorama image.

By executing a series of the aforementioned processes for the final processing unit SN, the left-eye areas 31L1 to 31LN are obtained as shown in FIG. 7, and they are combined with one another without a gap and set as the left-eye image 41L. Similarly, the right-eye areas 31R1 to 31RN are obtained, and they are combined with one another without a gap and set as the right-eye image 41R.

In this manner, it is possible to display the object included in the panorama image 11 in 3D space using the left-eye and right-eye images 41L and 41R completed as a 3D image.

Here, as described above, the depth-height degree (representing the degree of forward protrusion or backward recession) of the object displayed in 3D space increases as much as the disparity d, which is a distance between the left-eye area 31L1 and the right-eye area 31R1. Therefore, a user is capable of adjusting the depth-height degree of the object displayed in 3D space by adjusting the disparity d before a series of the aforementioned processes is executed.

In addition, an original panorama image 11 is created just by concatenating the images in the areas of the reference point P within the processing target area 21.

Example of 3D Display

Figure 8:
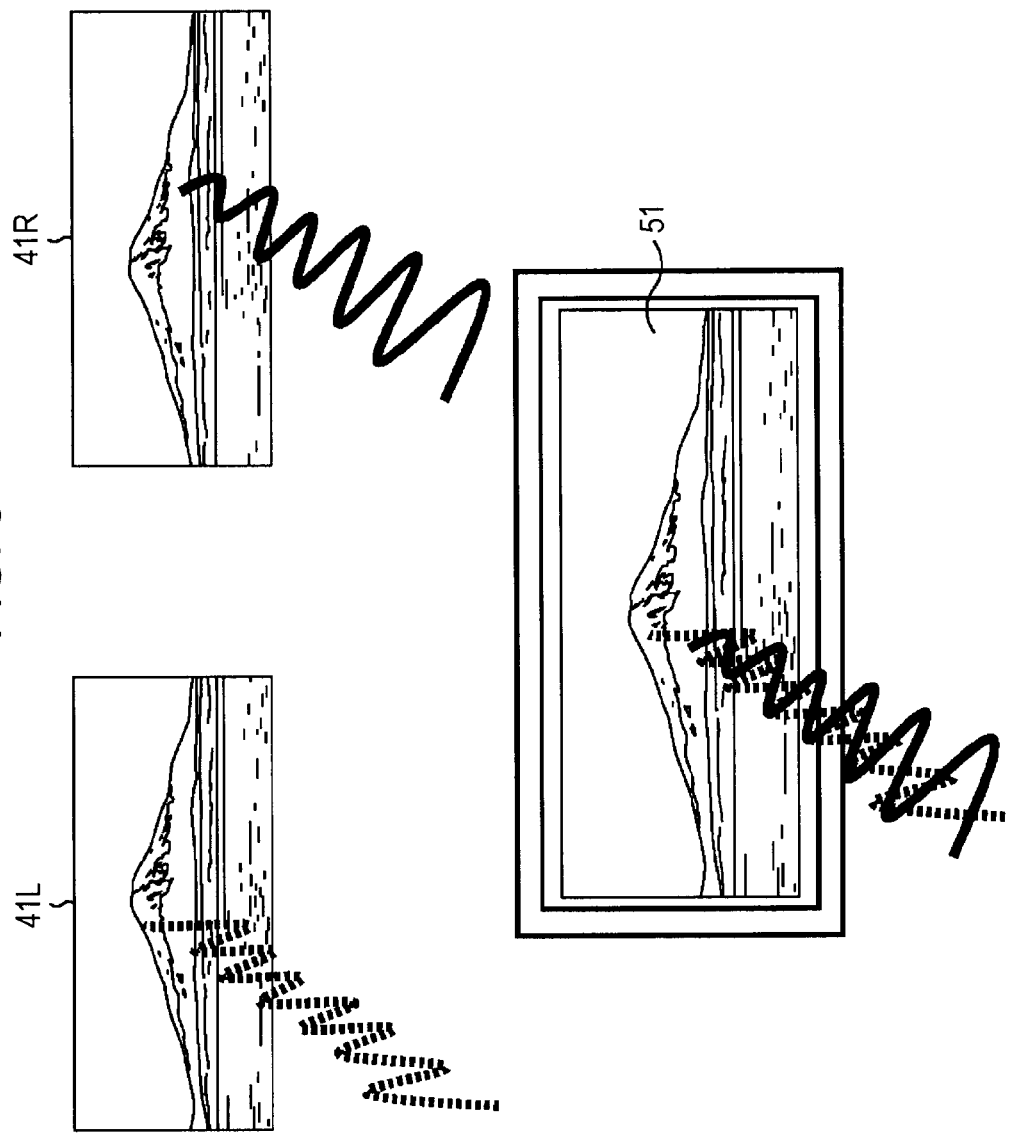
FIG. 8 is a diagram illustrating an example of 3D display.

FIGS. 8 and 9 illustrate an example of 3D display using the left-eye and right-eye images 41L and 41R.

Referring to FIG. 8, the display unit such as a liquid crystal of the imaging apparatus simultaneously displays polarization images 51 including both the left-eye image 41L as a vertical polarization image and the right-eye image 41R as a horizontal polarization image.

It is assumed that a user sees the polarization image 51 by wearing a set of polarization glasses 61 in this state as shown in FIG. 9. In this case, since only the vertical polarization light of the left-eye image 41L transmits through the left lens 71L, only the left-eye image 41L is projected to the left eye of a user. On the contrary, since only the horizontal polarization light of the right-eye image 41R transmits through the right lens 71R, only the right-eye image 41R is projected to the right eye of a user. As described above, various objects (such as a mountain or a lake in the example of FIG. 9) are separated from each other by a predetermined value of disparity in each of the left-eye image 41L and the right-eye image 41R. Therefore, a user may recognize that various objects are displayed in 3D space.

In addition, other examples of 3D image display will be described below with reference to FIGS. 34 and 35.

Exterior Configuration Example of Image Processing Apparatus

Next, a configuration of the image processing apparatus that generates a 3D image from such a panorama image according to a first embodiment will be described.

Figure 10A:
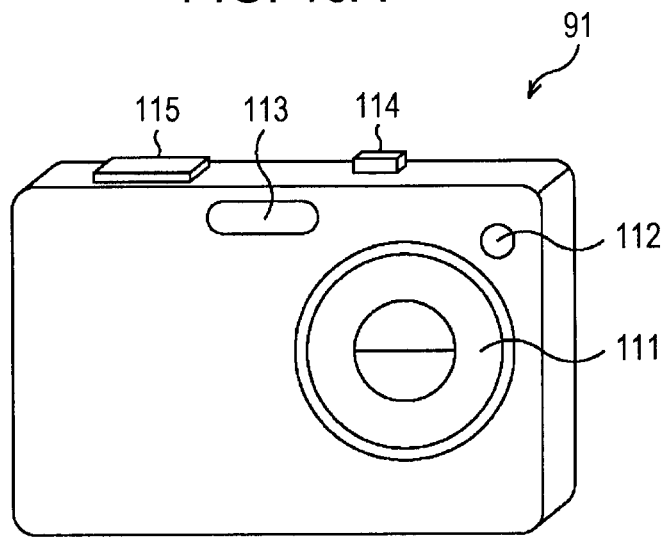
FIGS. 10A and 10B are diagrams illustrating an exterior configuration example of an imaging apparatus as an image processing apparatus according to an embodiment of the invention.
Figure 10B:
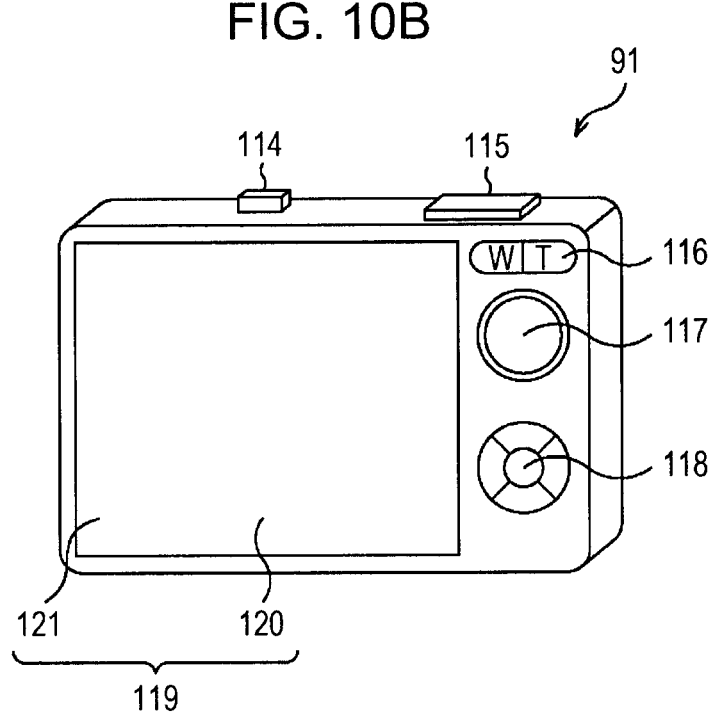

FIGS. 10A and 10B illustrate an exterior configuration example of the imaging apparatus 91 as an image processing apparatus according to an embodiment of the invention.

FIG. 10A is a front view of the imaging apparatus 91, and FIG. 10B is a rear view thereof.

Referring to FIG. 10A, an imaging apparatus 91 such as a digital camera is provided with a lens unit 111 in the right side as seen from the front. The lens unit 111 includes a lens for collecting light from the subject, a focus lens for adjusting focus, and an optical system such as an aperture (all not shown). The lens unit 111 is protruded from the casing of the imaging apparatus 91 when the imaging apparatus 91 is powered on, and the lens unit 111 is stored in the casing of the imaging apparatus 91 when the imaging apparatus 91 is powered off. In FIG. 10A, the lens unit 111 is stored in the casing of the imaging apparatus 91.

The imaging apparatus 91 is provided with an auto focus (AF) auxiliary light transmission unit 112 in the upper right side of the lens unit 111 as seen from the front. The AF auxiliary light transmission unit 112 illuminates the subject by irradiating light as AF auxiliary light toward the optical axis direction of the optical system of the lens unit 111. As a result, a so-called auto focus function is activated, by which an image of the subject is captured, for example, even in a dark location, and the subject is focused based on that image.

A strobe 113 is provided in the upper center side of the front face of the imaging apparatus 91.

A power on/off button 114 used to power on or off is provided in the right side on the upper face of the imaging device 91 as seen from the front, and a shutter button (release button) 115 used to record an image being currently captured is provided on the left side as seen from the front.

As shown in FIG. 10B, a zoom button 116 is provided in the upper right side of the rear face of the imaging apparatus 91. In the present embodiment, the zoom button 116 as a manipulation unit has first, second, third functions.

The first function is a function implemented when the imaging apparatus 91 makes a shot of the subject and a function of executing a telescopic view instruction Tele (for zooming up the subject) or a wide view instruction Wide (for zooming down the subject). Specifically, when a user instructs a telescopic view Tele to make a shot of the subject using the imaging apparatus 91, the portion printed as "T" in the zoom button 116 (hereinafter, referred to as a "T-button") is pressed. Meanwhile, when a user instructs a wide view Wide, the portion printed as "W" in the zoom button 116 (hereinafter, referred to as a "W-button") is pressed. In addition, a user may continuously instruct the telescopic view Tele or the wide view Wide by continuously pressing the T-button or the W-button.

The second function is a function implemented when the imaging apparatus 91 displays a 2D display image, and a function of instructing magnification or reduction of the object. Specifically, a user presses the T-button to instruct magnified display of the object included in the 2D display image. Meanwhile, a user presses the W-button to instruct reduced display. In addition, a user may continuously instruct the magnified display or the reduced display of the object by continuously pressing the T-button or the W-button.

The third function is a function implemented when the imaging apparatus 91 displays a 3D image, and a function of adjusting the depth-height degree of the object displayed in 3D space. Specifically, a user presses the T-button to instruct the imaging apparatus 91 to increase the depth-height degree of the object displayed in 3D space. Meanwhile, a user presses the W-button to instruct the imaging apparatus 91 to decrease the depth-height degree of the object displayed in 3D space. In addition, a user may instruct the imaging apparatus 91 to continuously increase or decrease the depth-height degree of the object by continuously pressing the T-button or the W-button. In addition, adjustment of the depth-height degree of the object of the 3D image will be described below.

A mode dial 117 is provided under the zoom button 116 capable of allocating first to third functions. The mode dial 117 is manipulated to select various modes of the imaging apparatus 91. The operation mode of the imaging apparatus 91 includes a shot mode for making a shot of the subject, or an image display mode for displaying shot images obtained by making a shot of the subject. In addition, a mode relating to various manipulations during the shot mode includes a mode of forcibly turning on or off light emission of the strobe 113, a mode of using a self-timer, and a mode of displaying the menu screen on the liquid crystal panel 120 described below.

Although not illustrated, a mode relating to various manipulations during the shot display mode also exists.

Under such a mode dial 117, a manipulation button 118 is provided. The manipulation button 118 is used when a user executes a previously allocated instruction manipulation. In the present embodiment, various instruction manipulations for the menu screen displayed on the liquid crystal panel 120 are allocated using the manipulation button 118.

For example, a user may move the cursor on the menu screen by manipulating the manipulation button 118 and select an item presented in the cursor arrangement position. As such an item, for example, an item representing a plurality of shot methods during the shot mode is displayed on the menu screen. In this regard, a user may select a desired shot method represented by the item by manipulating the manipulation button 118 to arrange the cursor on the item representing the desired shot method and select that item. In addition, a plurality of the shot methods include a panorama shot method, a continuous shot method, and a normal shot method. In addition, the panorama shot method refers to a method of making a shot to obtain a panorama image as a shot image. The continuous shot method refers to a method of making a shot through continuous shooting. The normal shot method refers to a method of making a shot to obtain a single image having a normal size as a shot image.

For example, as an example of items displayed on the menu screen, items representing a plurality of display methods during the image display mode are displayed on the menu screen. A user may select a display method such as 3D display or 2-dimensional image display (hereinafter, referred to as "2D display") during the image display mode from the menu screen displayed on the liquid crystal panel 120 by manipulating the manipulation button 118.

The touch screen 119 is obtained by integrating the liquid crystal panel 120 with the touch panel 121 provided thereon. The touch screen 119 may display various images using the liquid crystal panel 120 and receive a user's manipulation using the touch panel 121. A user may adjust the depth-height degree of the object in the 3D image even by manipulating the touch screen 119 as well as the zoom button 116. In addition, adjustment of the depth-height degree of the object of the 3D image using the touch screen 119 will be described below.

Internal Configuration Example of Imaging Apparatus

FIG. 11 illustrates an internal configuration example of the imaging apparatus 91 of FIGS. 10A and 10B.

In FIG. 11, the AF auxiliary light transmission unit 112 and the strobe 113 of FIGS. 10A and 10B are omitted.

The charge coupled device (CCD) 131 is operated, in response to a timing signal supplied from the timing generator (TG) 141, to receive the light incident from the subject through the lens unit 111, perform photoelectric conversion, and supply an analog image signal as an electric signal corresponding to the received light amount to the analog signal processing unit 132.

The analog signal processing unit 132 performs analog signal processing such as amplification of the analog image signal from the CCD 131 and supplies the image signal obtained through the analog signal processing to the analog/digital (A/D) conversion unit 133 under control of a central processing unit (CPU) 136.

The A/D conversion unit 133 analog-to-digitally converts the analog image signal from the analog signal processing unit 132 and supplies data on the image of the resulting digital signal to the digital signal processing unit 134 under control of the CPU 136.

The digital signal processing unit 134 performs digital signal processing such as noise removal processing for the data on the image from the A/D conversion unit 133 and supplies the resulting data on the image to the liquid crystal panel 120 under control of the CPU 136 after the processing. As a result, an image corresponding to the supplied data on the image, i.e., a shot image during shot-making (hereinafter, referred to as a through-the-lens image) is displayed on the liquid crystal panel 120. In addition, the digital signal processing unit 134 compressively encodes the data on the image from the A/D conversion unit 133, for example, based on a Joint Photographic Experts Group (JPEG) scheme and supplies the resulting compressively encoded data to the recording device 135 to record them. Furthermore, the digital signal processing unit 134 decompresses and decodes the compressively encoded data recorded in the recording device 135 and supplies the resulting data on the image to the liquid crystal panel 120. As a result, an image corresponding to the data on the supplied image, i.e., the recorded shot image is displayed on the liquid crystal panel 120.

The recording device 135 is a removable recording medium including a disc such as a digital versatile disc (DVD), a semiconductor memory such as a memory card, or other removable media and is adapted to be readily attached or detached to/from the imaging apparatus 91. Data on the shot images are recorded in the recording device 135. In other words, in the first embodiment, data on shot images having a normal size obtained by making a shot using a normal shot method and data on shot images having a panorama size obtained by making a shot using a panorama shot method (hereinafter, referred to as a panorama image) are recorded. In addition, data for the thumbnail images of the shot images are recorded in the recording device 135.

The CPU 136 controls each unit of the imaging apparatus 91 by executing the program recorded in a program read-only memory (ROM) 139 and executes various processes in response to the signal from the touch panel 121 or the manipulation unit 137.

In the present embodiment, the CPU 136 may activate each function of the recording processing unit 161, the image display processing unit 162, and the 3D image creation processing unit 163 by executing a predetermined program. In addition, each function of the recording processing unit 161, the image display processing unit 162, and the 3D image creation processing unit 163 will be described below with reference to FIGS. 12 to 14.

The manipulation unit 137 is manipulated by a user and supplies the signal corresponding to that manipulation to the CPU 136. In addition, the manipulation unit 137 includes the power on/off button 114, the shutter button 115, the zoom button 116, the mode dial 117, and the manipulation button 118 as shown in FIG. 10.

The electrically erasable programmable ROM (EEPROM) 138 stores various information set in the imaging apparatus 91, data necessary to be stored even when the imaging apparatus 91 is powered off, and the like under control of the CPU 136.

The program ROM 139 stores programs executed by the CPU 136 and data necessary for the CPU 136 to execute a program. The random access memory (RAM) 140 temporarily stores programs or data necessary for the CPU 136 to execute various processes.

The timing generator 141 supplies the timing signal to the CCD 131 under control of the CPU 136. Based on the timing signal supplied from the timing generator 141 to the CCD 131, the exposure time (shutter speed) of the CCD 131 or the like is controlled.

The motor driver 142 drives the actuator 143 including a motor under control of the CPU 136. By driving the actuator 143, the lens unit 111 is protruded from the casing of the imaging apparatus 91 or stored in the casing of the imaging apparatus 91. In addition, by driving the actuator 143, the aperture of the lens unit 111 is adjusted, or the focus lens of the lens unit 111 is moved.

In the imaging apparatus 91 configured as described above, the CCD 131 receives the light incident from the subject through the lens unit 111, performs photoelectric conversion, and outputs the resulting analog image signal. The analog image signal output from the CCD 131 is converted into the data on the image of the digital signal through the analog signal processing unit 132 and the A/D conversion unit 133 and supplied to the digital signal processing unit 134.

The digital signal processing unit 134 supplies the data on the image from the A/D conversion unit 133 to the liquid crystal panel 120 so that a so-called through-the-lens image is displayed on the liquid crystal panel 120.

Then, as a user manipulates the shutter button 115 (FIG. 10), a signal corresponding to that manipulation is supplied from the manipulation unit 137 to the CPU 136. As the signal corresponding to the manipulation of the shutter button 115 is supplied from the manipulation unit 137, the CPU 136 controls the digital signal processing unit 134 so as to compress the data on the image supplied from the A/D conversion unit 133 to the digital signal processing unit 134 and record the resulting compressed data on the image in the recording device 135.

Through the aforementioned process, a so-called photographing is performed.

In addition, the program executed by the CPU 136 may be previously installed (stored) in the program ROM 139 or recorded in the recording device 135 and then supplied to a user as package media, so as to be installed in the EEPROM 138 from the recording device 135 through the digital signal processing unit 134 and the CPU 136. In addition, the program executed by the CPU 136 may be directly downloaded to the imaging apparatus 91 of FIG. 11 or a computer (not shown) from a download website and supplied to the imaging apparatus 91 of FIG. 11 so as to be installed in the EEPROM 138.

Configuration Example of Recording Processing Unit 161

Figure 12:
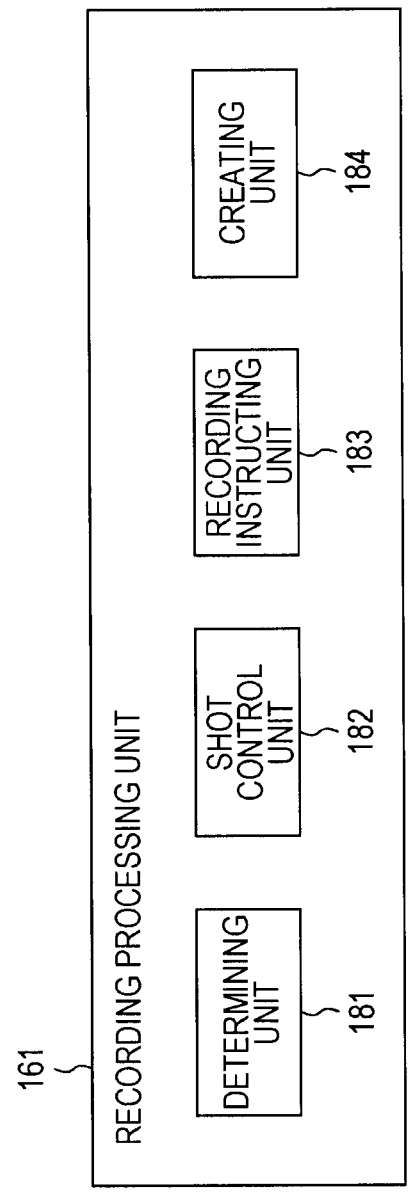
FIG. 12 is a block diagram illustrating a functional configuration example of a recording processing unit.

FIG. 12 is a block diagram illustrating a functional configuration example of the recording processing unit 161 of the CPU 136 of the FIG. 11.

The recording processing unit 161 of FIG. 12 includes a determining unit 181, a shot control unit 182, a recording instructing unit 183, and a creating unit 184.

The determining unit 181 determines which one of a plurality of shot methods of the imaging apparatus 91 is selected by a user. In the present embodiment, a normal shot method for making a shot of an image having a normal size and a panorama shot method for making a shot of a panorama image are employed. Such a manipulation for selecting a shot method is performed using a menu screen. In other words, a user selects the normal shot method or the panorama shot method by performing a predetermined pressing manipulation of the manipulation button 118 while viewing the menu screen displayed on the liquid crystal panel 120. The determining unit 181 determines which one of the normal shot method and the panorama shot method is selected by analyzing the contents of the pressing manipulation of the manipulation button 118 of a user.

The shot control unit 182 controls the lens unit 111, the CCD 131, the analog signal processing unit 132, and the A/D conversion unit 133 (hereinafter, referred to as an imaging unit). That is, the imaging unit makes a shot of the subject according to the shot method determined by the determining unit 181 under control of the shot control unit 182. As a result, it is possible to obtain data on the image defined by the corresponding shot method. That is, in the case of the normal shot method, it is possible to obtain data on the image having a normal size. In the case of the panorama shot method, it is possible to obtain panorama image data.

The recording instructing unit 183 instructs the digital signal processing unit 134 to record the image obtained by making a shot of the subject using the shot control unit 182 (hereinafter, referred to as a shot image). In response to such an instruction, the digital signal processing unit 134 records data on the shot image in the recording device 135.

The creating unit 184 creates the thumbnail image data of the shot image and records the data in the recording device 135. In addition, the thumbnail image refers to an objective image displayed as a list or an image reduced from the shot image.

Configuration Example of Image Display Processing Unit 162

Figure 13:
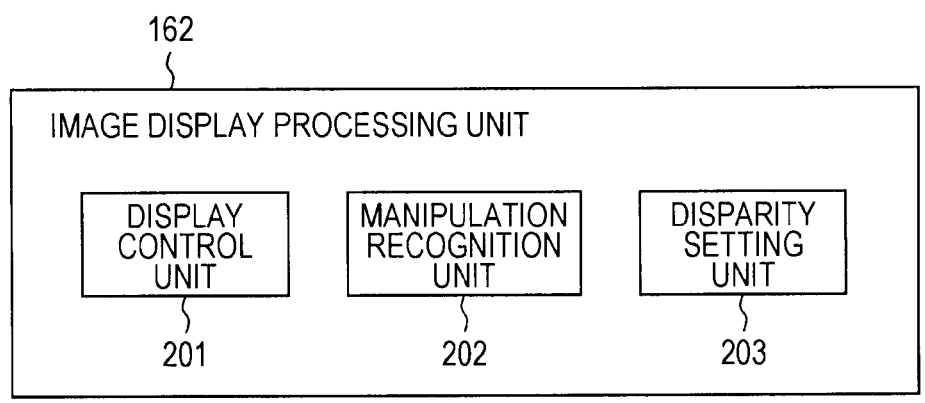
FIG. 13 is a block diagram illustrating a functional configuration example of an image display processing unit.

FIG. 13 is a block diagram illustrating a functional configuration example of the image display processing unit 162 of the CPU 136 of FIG. 11.

The image display processing unit 162 of FIG. 13 includes a display control unit 201, a manipulation recognition unit 202, and a disparity setting unit 203.

The display control unit 201 performs control of displaying various images on the liquid crystal panel 120. Various images used as a control target of the display control unit 201, i.e., various images used as a display target of the liquid crystal panel 120 include an image supporting a user during the manipulation (hereinafter, referred to as a manipulation image), i.e., a menu screen or an image including depth information in addition to the 3D image. In addition, the depth information refers to information representing the depth-height degree of the object of the 3D image, i.e., information for specifying disparity. Usage of the depth information will be described below.

The manipulation recognition unit 202 recognizes contents of the manipulation in the case where a user manipulates the zoom button 116 or the manipulation button 118 while the manipulation image is displayed on the liquid crystal panel 120 under control of the display control unit 201. For example, in the case where the zoom button 116 is pressed while an image including the depth information is displayed on the liquid crystal panel 120 under control of the display control unit 201, the manipulation recognition unit 202 recognizes that the manipulation for instructing adjustment of the depth information has been made. For example, when 3D display, 2D display, or the like is selected from the menu screen displayed on the liquid crystal panel 120 under control of the display control unit 201, and the manipulation button 118 is pressed, the manipulation recognition unit 202 recognizes that the display method of the image display mode has been instructed. In addition, for example, termination of the image display mode is selected from the menu screen displayed on the liquid crystal panel 120 under control of the display control unit 201, and the manipulation button 118 is pressed, the manipulation recognition unit 202 recognizes that termination of the processing has been instructed.

The disparity setting unit 203 sets the disparity d based on the adjustment instruction manipulation of the depth information recognized by the manipulation recognition unit 202. In other words, in the present embodiment, a relationship between the depth information value and the disparity d is established such that, as the depth information value increases, the disparity d also increases. Therefore, as a user's manipulation instructs adjustment of the depth information by pressing the zoom button 116 while an image including the depth information is displayed, the disparity setting unit 203 sets the disparity d based on the depth information value specified in response to the pressing manipulation of the zoom button 116. As described above, the depth-height degree of the object displayed in 3D space is determined based on the disparity d. Therefore, the fact that the disparity d is adjusted by the disparity setting unit 203 means that the depth-height degree of the object displayed in 3D space is adjusted.

Configuration Example of 3D Image Creation Processing Unit 163

Figure 14:
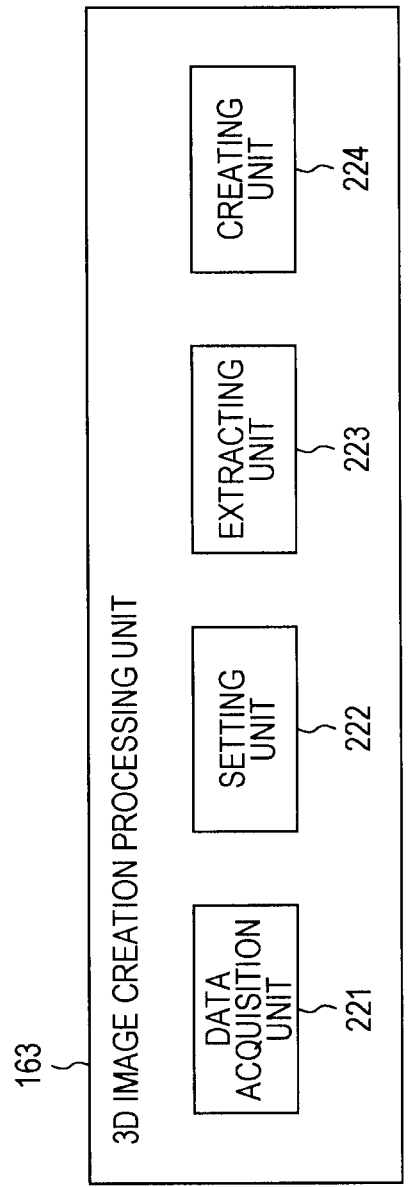
FIG. 14 is a block diagram illustrating a functional configuration example of a 3D image creation processing unit.

FIG. 14 is a block diagram illustrating a functional configuration example of the 3D image creation processing unit 163 of the CPU 136 of FIG. 11.

The 3D image creation processing unit 163 includes a data acquisition unit 221, a setting unit 222, an extracting unit 223, and a creating unit 224.

The data acquisition unit 221 obtains data on the original image of the 3D image, e.g., in the present embodiment, panorama image data recorded in the recording device 135.

The setting unit 222 classifies the panorama image data obtained by the data acquisition unit 221 into a plurality of processing units Sk in the horizontal direction and sets one of a plurality of the processing units Sk as the processing target area 21. In addition, the setting unit 222 sets a reference point P at a predetermined position in the horizontal direction of the processing target area 21.

The extracting unit 223 extracts data on the processing target area 21 set by the setting unit 222. In addition, the extracting unit 223 extracts data on the left and right areas separated by the same distance from the reference point P set by the setting unit 222 among the data on the extracted processing target area 21 as the data on the left-eye area 31Lk and the right-eye area 31Rk, respectively.

The creating unit 224 as the 3D image creating means accumulates each of the left-eye areas 31Lk extracted by the extracting unit 223 for each of a plurality of processing units Sk to create data on the left-eye image. Similarly, the creating unit 224 accumulates each of the right-eye areas 31Rk extracted by the extracting unit 223 for each of a plurality of processing units Sk to create data on the right-eye image.

Image Recording Process

Next, the process executed by the recording processing unit 161 (hereinafter, referred to as an image recoding process) will be described with reference to FIG. 15.

Figure 15:
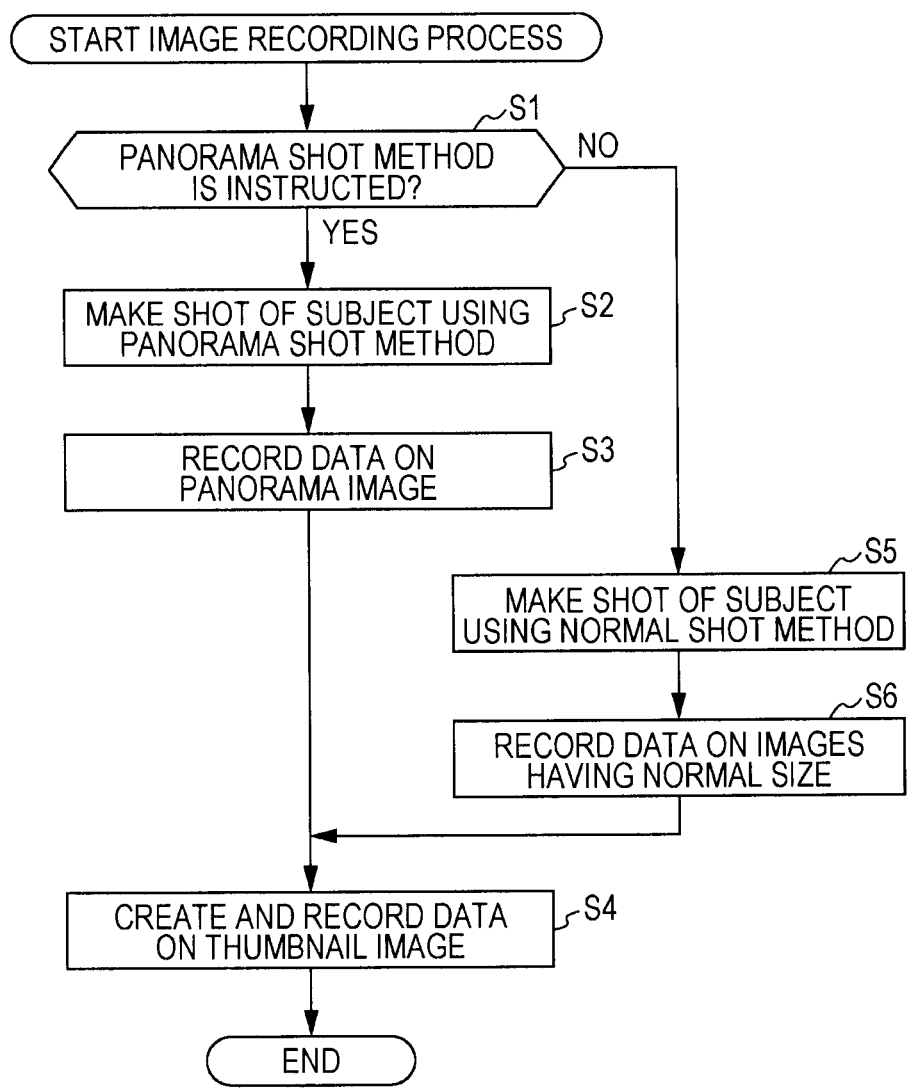
FIG. 15 is a flowchart illustrating an example of the image recording process.

FIG. 15 is a flowchart illustrating an example of an image recording process using a recording processing unit 161.

As a user selects a shot mode by manipulating the mode dial 117, the image recording process is initiated.

In the step S1, the determination unit 181 determines whether or not a panorama shot method is instructed.

In the present embodiment, in the case where a user presses the manipulation button 118 to select the panorama shot method while seeing the menu screen displayed on the liquid crystal panel 120, it is determined to be YES in the step S1, and the process advances to the step S2.

In the step S2, the shot control unit 182 controls the aforementioned shot unit to make a shot of the subject using a panorama shot method. As a result, panorama image data are obtained as the shot image data, and the process advances to the step S3.

In the step S3, the recording instructing unit 183 records the panorama image data obtained as a result of the step S2 in the recording device 135 by controlling the digital signal processing unit 134.

In the step S4, the creating unit 184 creates the thumbnail image data of the shot image (in this case, the panorama image) and records them in the recording device 135. As a result, the image recording process is terminated.

In this manner, when a user selects the panorama shot method, panorama image data and the thumbnail image thereof are recorded in the recording device 135. As a result, when a user selects the normal shot method, it is determined in the step S1 that the panorama shot method is instructed, and the process advances to the step S5.

In the step S5, the shot control unit 182 makes a shot of the subject using the normal shot method by controlling the aforementioned imaging unit. As a result, data on the image having a normal size are obtained as data on the shot image, and the process advances to the step S6.

In the step S6, the recording instructing unit 183 controls the digital signal processing unit 134 to record the data on the image having a normal size obtained as a result of the step S5 in the recording device 135. When the data on the image having a normal size are recorded in the recording device 135, the process advances to the step S4.

In the step S4, the creating unit 184 creates the thumbnail image data of the shot image (in this case, the image having a normal size) and records the data in the recording device 135. As a result, the image recording process is terminated.

Image Display Process

Next, the process executed by the image display processing unit 162 (hereinafter, referred to as an image display process) will be described with reference to FIG. 16.

FIG. 16 is a flowchart illustrating an example of the image display process in the image display processing unit 162.

When a user selects the image display mode by manipulating the mode dial 117, the image display process is initiated.

In the step S31, the display control unit 201 displays the thumbnail image on the liquid crystal panel 120. In other words, the display control unit 201 reads the thumbnail image data recorded in the recording device 135 through the image recording process of FIG. 15 and displays the thumbnail image on the liquid crystal panel 120.

In the step S32, the manipulation recognition unit 202 determines whether or not the thumbnail image displayed through the process of the step S31 is selected.

When no thumbnail image is selected at all, it is determined as NO in the step S32, and the process returns to the step S32 so that the subsequent process is repeated. That is, until the thumbnail image is selected, the determining process of the step S32 is repeated.

Then, in the case where a user presses the manipulation button 118 to select predetermined one of the thumbnail images while seeing the menu screen displayed on the liquid crystal panel 120, it is determined as YES in the step S32, and the process advances to the step S33.

In the step S33, the display control unit 201 displays the image selected through the process in the step S32 on the liquid crystal panel 120. In other words, the original image corresponding to the thumbnail image is displayed.

In the step S34, the manipulation recognition unit 202 determines whether or not 3D display is instructed.

If it is determined that 3D display is not instructed, it is determined as NO in the step S34, and the process advances to the step S45.

In the step S45, the display control unit 201 displays in 2D space the shot image corresponding to the thumbnail image selected through the process in the step S32 on the liquid crystal panel. As a result, the image display process is terminated.

On the contrary, in the case where a user selects the 3D display method by pressing the manipulation button 118 while seeing the menu screen displayed on the liquid crystal panel 120, it is determined as YES in the step S34 because 3D display is instructed, and the process advances to the step S35.

In the step S35, the manipulation recognition unit 202 determines whether or not the image selected through the process in the step S32 has a normal size. In other words, it is determined whether or not the image displayed through the process in the step S33 has a normal size.

When the shot image corresponding to the thumbnail image selected through the process in the step S32 is an image captured using a normal shot method, it is determined as YES in the step S35, and the process advances to the step S46.

In the step S46, the display control unit 201 displays a message stating that it is difficult to implement 3D display on the liquid crystal panel 120. That is, in the present embodiment, since the 3D image is created from the panorama image, when the shot image has a normal size, it is difficult to implement 3D display of such a shot image. Therefore, a message notifying that 3D display is difficult is displayed on the liquid crystal panel 120, and the image display process is terminated.

On the contrary, when the shot image corresponding to the thumbnail image selected through the process in the step S32 is a panorama image, since 3D display can be made, it is determined as NO in the step S35, and the process advances to the step S36.

In the step S36, the display control unit 201 displays a message for urging a user to specify the depth on the liquid crystal panel 120.

In the step S37, the display control unit 201 displays an image including the depth information on the liquid crystal panel 120. The method of displaying the depth information is not particularly limited, and in the present embodiment, a value between 0 and 100% is displayed. Here, if the depth information value is 0%, it means that the object is displayed as a 2D display without a height difference of the object. On the contrary, if the depth information value is 100%, it means that the depth-height degree of the object is strongly displayed at its maximum. In addition, a recommended depth information value is set as a default value, and in the process of the step S37 after a message for attempting to specify the depth is displayed by the process of the step S36, the default depth information value is displayed on the liquid crystal panel 120.

In the step S38, the manipulation recognition unit 202 determines whether or not the zoom button 116 is pressed.

When the zoom button 116 is not pressed, it is determined as NO in the step S38, and the process returns to the step S37, so that the subsequent process is repeated. That is, the loop process including NO in the steps S37 and S38 is repeated for as long as the zoom button 116 is not pressed, and the image is continuously displayed on the liquid crystal panel 120 without updating the depth information value.

Then, if the zoom button 116 is pressed, it is determined as YES in the step S38, and the process advances to the step S39.

In the step S39, the disparity setting unit 203 changes the depth information value in response to pressing of the zoom button 116. Specifically, for example, when the T-button of the zoom button 116 is pressed, the disparity setting unit 203 increases the depth information value being displayed. As a result, the depth-height degree of the object displayed in 3D space through the process of the step S43 described below increases. Meanwhile, when the W-button of the zoom button 116 is pressed, the disparity setting unit 203 decreases the depth information value being displayed. As a result, the depth-height degree of the object of the 3D image displayed through the process of the step S43 described below decreases.

In addition, the lower limit of the operable range of the zoom button 116, i.e., the limitation position in which the operation is inhibited when the W-button is continuously pressed corresponds to a depth information value of 0. Inversely, the upper limit of the operable range of the zoom button 116, i.e., the limitation position in which the operation is inhibited when the T-button is continuously pressed corresponds to a depth information value of 100. In addition, each position obtained by dividing the operable range of the zoom button 116 by 100 corresponds to each depth information value between 0 and 100. In this manner, the depth information value is mapped to the operable range of the zoom button 116.

In the step S40, the manipulation recognition unit 202 determines whether or not the pressing of the zoom button 116 is released.

In the case where the pressing of the zoom button 116 is not released (i.e., in the case where the zoom button 116 is continuously pressed), it is determined as NO in the step S40, and the process advances to the step S37, so that the subsequent process is repeated. That is, as long as the zoom button 116 is continuously pressed, the loop process including YES in the steps S37 and S38 and NO in the steps S39 and S40 is repeated, and the depth information value is sequentially updated, so that the state obtained by sequentially updating the depth information value is displayed on the liquid crystal panel 120.

Then, in the case where the pressing of the zoom button 116 is released, it is determined as YES in the step S40, and the process advances to the step S41.

In the step S41, the disparity setting unit 203 sets the disparity d based on the depth information at the time point when the pressing of the zoom button 116 is released. As described above, as the disparity d increases, the depth-height degree of the object of the displayed 3D image also increases. In the present embodiment, each depth information value corresponds to each disparity value d. Therefore, as the depth information value increases, a higher value of disparity d is set.

In the step S42, the 3D image creation processing unit 163 creates the 3D image, i.e., the left-eye and right-eye images based on the disparity d set through the process of the step S41. Hereinafter, a series of processes for creating the 3D image using the 3D image creation processing unit 163 will be referred to as a 3D image creating process. Details of the 3D image creating process will be described below with reference to FIG. 17.

As the 3D image creating process of the step S42 is executed, and the 3D image, i.e., the left-eye and right-eye images are created, the process advances to the step S43.

In the step S43, the display control unit 201 displays the 3D image created through the 3D image creating process of the step S42 on the liquid crystal panel 120. That is, the display control unit 201 sets the left-eye and right-eye images as the vertical and horizontal polarization images, respectively, as described in conjunction with FIG. 8 and simultaneously displays both images on the liquid crystal panel 120. In this state, a user can visually recognize the object displayed in 3D space, i.e., a state that various objects protrude and recess based on the degree of the disparity d by wearing polarization glasses and seeing the polarization image.

In the step S44, the manipulation recognition unit 202 determines whether or not an update of the depth information is instructed.

In the present embodiment, in the case where a user desires to change the depth-height degree by seeing the object displayed in 3D space, i.e., in the case where update of the depth information is instructed, a user presses the zoom button 116 again as a manipulation for that purpose. Therefore, in the present embodiment, in the case where the zoom button 116 is pressed while the 3D image is displayed on the liquid crystal panel 120, it is determined as YES in the step S44, and the process returns to the step S37, so that the subsequent process is repeated. That is, whenever the update of the depth information is instructed, the loop process including the steps S37 to S44 is repeated, the disparity d is set again based on the updated depth information value, so that the depth-height degree of the object of the displayed 3D image changes.

In the case where update of the depth information is not instructed, it is determined as NO in the step S44, and the process advances to the step S45.

In the step S45, the manipulation recognition unit 202 determines whether or not the process termination is instructed.

In the case where the process termination is not instructed, it is determined as NO in the step S45, and the process returns to the step S43, so that the subsequent process is repeated. That is, the loop process including the steps S43 to S45 is repeated as long as the process termination is not instructed, and the 3D image created through the 3D image creating process of the step S42 is displayed on the liquid crystal panel 120.

Then, in the case where the process termination is instructed, it is determined as YES in the step S45, and the image display process is terminated.

In this manner, when the image display process is executed, the disparity d is set based on the pressing manipulation of the zoom button 116, and the object is displayed in 3D space with the depth-height degree corresponding to the set disparity d. Specifically, for example, when the T-button of the zoom button 116 is pressed, the depth information value increases, and the disparity d is also set to a high value accordingly. As a result, the depth-height degree (protruded length) of the object displayed in 3D space increases. On the contrary, when the W-button of the zoom button 116 is pressed, the depth information value decreases, and the value of disparity d also decreases accordingly. As a result, the depth-height degree (protruded length) of the object displayed in 3D space decreases. In other words, a user is capable of adjusting the depth-height degree of the object displayed in 3D space just by performing an intuitive manipulation using the manipulation unit, i.e., called the zoom button 116, for manipulating the depth direction of the 2D image.

3D Image Creating Process of 3D Image Creation Processing Unit 163

Next, the 3D image creating process of the step S42 of the image display process of FIG. 16 will be described with reference to the flowchart of FIG. 17.

FIG. 17 is a flowchart illustrating an example of the 3D image creating process using the 3D image creation processing unit 163.

In the step S61, the data acquisition unit 221 obtains data on the image. In other words, the panorama image data selected in the step S32 of the image display process of FIG. 16 are obtained from the recording device 135.

In the step S62, the setting unit 222 sets one of the processing units in the image as the processing target area. That is, as shown in FIG. 4, the setting unit 222 classifies the obtained panorama image data into a plurality of processing units S1 to SN and sets one Sk of the processing units as the processing target area 21.

In the step S63, the extracting unit 223 extracts the data on the image of the processing target area.

In the step S64, the setting unit 222 sets a reference point within the processing target area. That is, as shown in FIG. 4, the setting unit 222 determines a predetermined position in the horizontal direction within the set processing target area 21 as the reference point P.

In the step S65, the extracting unit 223 extracts the area separated from the reference point P in the left side by ½ of the disparity as the left-eye area. That is, as shown in FIG. 5, the setting unit 222 extracts the area having a predetermined width w separated from the reference point in the left side by a distance of a half of the disparity d (=d/2) as the left-eye area 31L1.

In the step S66, the extracting unit 223 extracts the area separated from the reference point P in the right side by ½ of the disparity as the right-eye area. That is, as shown in FIG. 5, the setting unit 222 extracts the area having a predetermined width w separated from the reference point P in the right side by a distance of a half of the disparity d (=d/2) as the right-eye area 31R1. The disparity d used in the process of the steps S65 and S66 is set based on the depth information at the time point when the pressing of the zoom button 116 is released by a user during the processing of the step S40 of the image display process shown in FIG. 16.

Here, the reference point P will be described with reference to FIG. 18. In addition, a relationship between the extracted left-eye area 31L and the right-eye area 32R and the disparity d will be described with reference to FIG. 19.

Figure 18A:
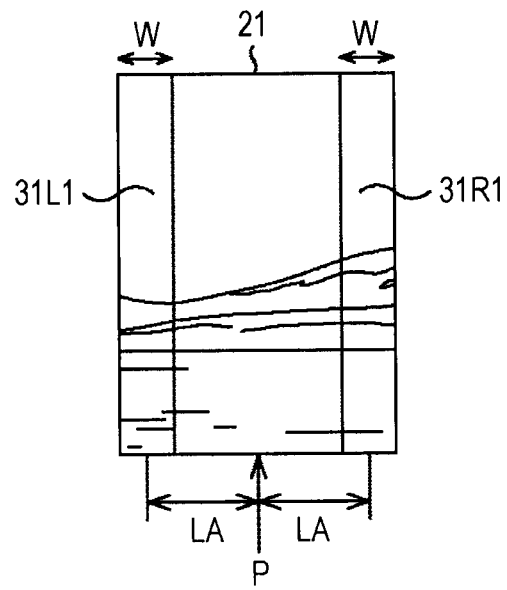
FIGS. 18A and 18B are diagrams illustrating a reference point within a processing target area.
Figure 18B:
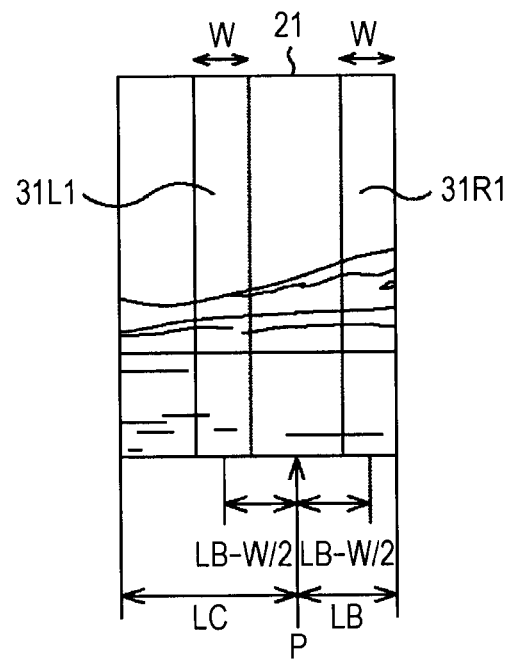

FIGS. 18A and 18B illustrate a reference point P within the processing target area.

Referring to FIG. 18A, in the case where the reference point P is set to the center of the processing target area 21, the areas separated from the reference point P by a distance of a half of the disparity d (=d/2) in the left and right sides are extracted as the left-eye area 31L and the right-eye area 31R, respectively. That is, both left and right ends of the processing target area 21 are extracted as the left-eye area 31L and the right-eye area 31R, respectively.

Meanwhile, as shown in FIG. 18B, in the case where the reference point P is not set to the center of the processing target area 21, the length from the reference point P to the closer end out of the both end areas of the processing target area 21 is specified as LB, and the length from the reference point P to the farther end is specified as LC (>LB). In this case, a half of the disparity d (=d/2) becomes a length of LB−w/2. That is, the areas separated from the reference point P in the left and right directions by the length LB−w/2, which is a half of the disparity d (=d/2) are extracted as the left-eye area 31L and the right-eye area 31R. For example, in the example of FIG. 18B, since the reference point P is set in the right side from the center of the processing target area 21, the length from the reference point P to the right end becomes a length LB. Therefore, the area having a width w separated from the reference point P in the right direction by the length LB−w/2 is extracted as the right-eye area 31R. In addition, the area having a width w separated from the reference point P in the left direction by the length LB−w/2 is extracted as the left-eye area 31L.

Figure 19:
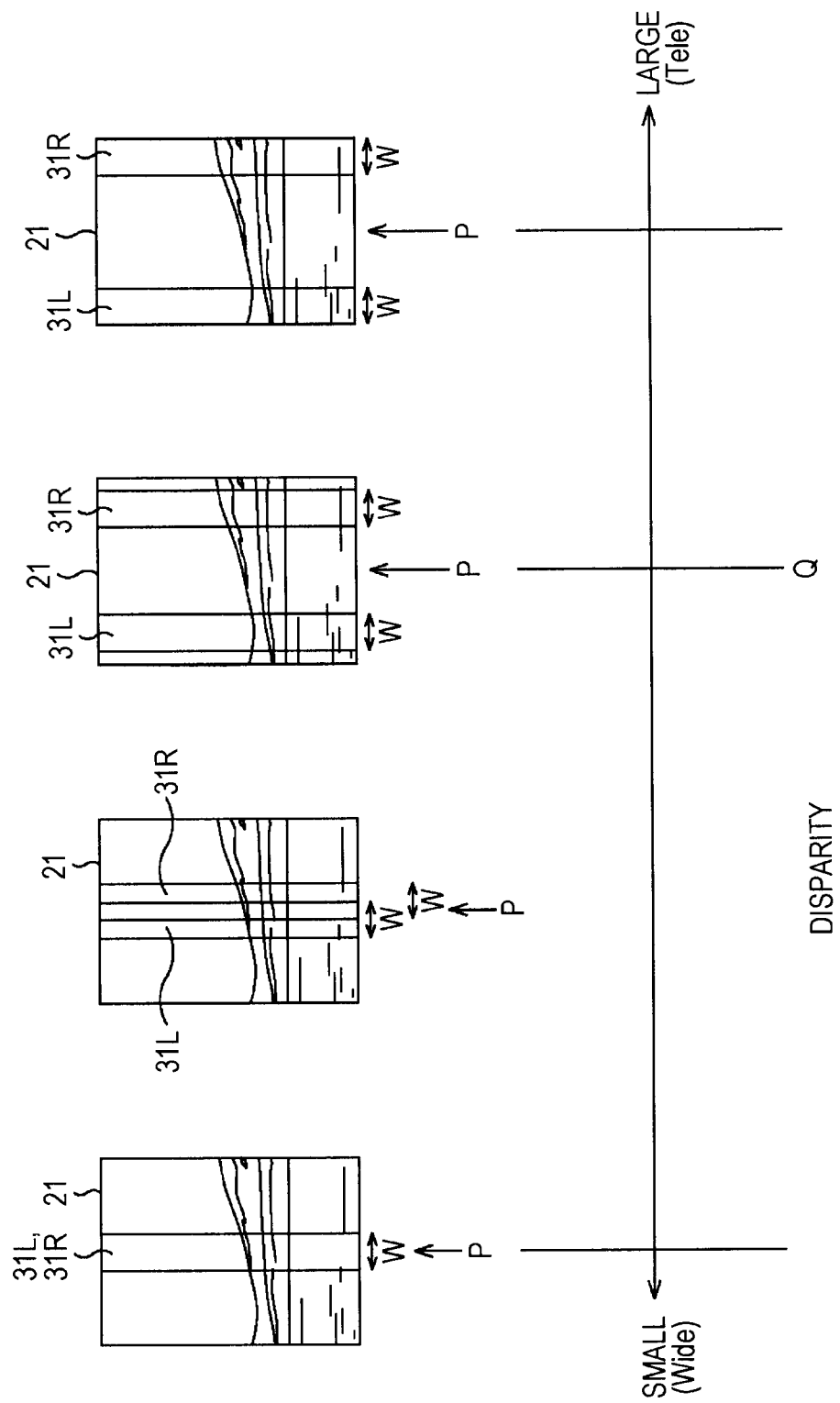
FIG. 19 is a diagram illustrating a relationship between disparity and left-eye and right-eye areas extracted from the processing target area.

FIG. 19 illustrates a relationship between the disparity d and the left-eye and right-eye areas extracted from the processing target area 21.

In FIG. 19, the horizontal axis denotes the magnitude of the disparity d. When the T-button of the zoom button 116 is pressed, the disparity d increases. When the W-button is pressed, the disparity d decreases.

In the present embodiment, a recommended value of disparity d is set to the default value Q. Specifically, for example, the processing target area 21 in the case where the disparity d is set to the default value Q is shown third from the left of FIG. 19. In this case, the area having a width w separated from the reference point P in the left direction by a half of the disparity d (=d/2) is extracted as the left-eye area 31L, and the area having a width w separated from the reference point P in the right direction by a half of the disparity d (=d/2) is extracted as the right-eye area 31R. In addition, the depth information value displayed in the step S37 of FIG. 16 corresponds to the default value Q of the disparity d.

When the W-button of the zoom button 116 is pressed while the disparity d is set to the default value Q, the depth information value decreases. Accordingly, the disparity d is set to be smaller than the default value Q. If the disparity d is set to a predetermined value smaller than the default value Q, for example, as shown second from the left of FIG. 19, the left-eye area 31L having a width w and the right-eye area 31R having width w extracted from the processing target area 21 partially overlapped. In this case, the depth-height degree of the object of the displayed 3D image is lower than the case where the disparity d is set to the default value Q.

If the W-button of the zoom button 116 is further pressed in this state, the depth information value decreases, and the disparity d is set to further decrease accordingly. For example, as shown in the first left side of FIG. 19, in the case where the disparity d is set to 0, the left-eye area 31L having a width w and the right-eye area 31R having a width w extracted from the processing target area 21 are perfectly overlapped. That is, the horizontal centers of the left-eye area 31L having a width w and the right-eye area 31R having a width w are located in the reference point P. In this case, the object displayed in 3D space has a zero depth, i.e., becomes a normal 2D display image having no depth or height. Since the state of the zero disparity (d=0) corresponds to the lower limit position of the operable range of the position of the zoom button 116, the disparity d is not further reduced even when the W-button of the zoom button 116 is further pressed.

On the contrary, if the T-button of the zoom button 116 is pressed in a state where the disparity d is set to the default value Q, the depth information value increases, and the disparity d is set to increase higher than the default value Q accordingly. For example, in the case where the disparity d becomes 100 as shown fourth from the left (the rightmost side) of FIG. 19, the left-eye area 31L having a width w and the right-eye area 31R having a width w extracted from the processing target area 21 are located in the both left and right ends of the processing target area 21, respectively.

In this case, the depth-height degree of the object displayed in 3D space is higher than that of a state where the disparity d is set to the default value Q. Since the disparity d set to 100 corresponds to the upper limit position of the operable range of the zoom button 116 as described above, the disparity d no more increases even when the T-button of the position of the zoom button 116 is further pressed.

Returning to the description of the flowchart of FIG. 17, in the step S67, the creating unit 224 creates data by adding the left-eye area extracted by the extracting unit 223 into the left-eye image. That is, as shown in FIG. 6, the extracted left-eye area 31Lk is added to the left-eye image.

In the step S68, the creating unit 224 creates data in which the right-eye area extracted from the extracting unit 223 is added to the right-eye image. That is, as shown in FIG. 6, the extracted right-eye area 31Rk is added to the right-eye image.

In the step S69, the setting unit 222 determines whether or not all of the processing target areas are set.

In the case where all of the processing target areas are not set yet, it is determined as NO in the step S69, and the process returns to the step S62, so that the subsequent process is repeated. That is, as shown in FIG. 6, the panorama image data 11 classified into a plurality of processing units S1 to SN are set as the processing target area 21 in the sequence of the processing unit S1, S2, S3, ..., and so on, and the left-eye area 31L1 and the right-eye area 31R extracted from the processing target area 21 are added to the left-eye and right-eye images, respectively. That is, until all of the processing target areas are set, the loop process including the steps S62 to S69 is repeated, and the left-eye area 31L and the right-eye area 31R extracted from the processing target area 21 are added to the left-eye and right-eye images, respectively.

Then, when all of the processing target areas are set, it is determined as YES in the step S69, so that the 3D image creating process is terminated, and the process advances to the step S43 in FIG. 16.

In this manner, a user sets the disparity d in the 3D display by manipulating the zoom button 116 for instructing magnification or reduction of the object in 2D display, and the object having a depth-height degree corresponding to the set disparity d is displayed in 3D space. That is, a user is capable of adjusting the depth-height degree of the object displayed in 3D space just by performing an intuitive manipulation using the manipulation unit, i.e., called the zoom button 116, for manipulating the depth direction of the 2D image.

2. Second Embodiment

In the aforementioned first embodiment, the 3D image was created using the panorama image. On the contrary, in the second embodiment, the 3D image is created from a plurality of images obtained by making shots of the subject using a continuous shot method (hereinafter, referred to as continuous shot images).

Since the configuration of the imaging apparatus 91 of the second embodiment is basically the same as that of the first embodiment shown in FIGS. 10 and 11, descriptions of the similar parts will be omitted, and the recording device 135, which is a difference therebetween, will be solely described.

Configuration Example of Recording Device 135

Figure 20:
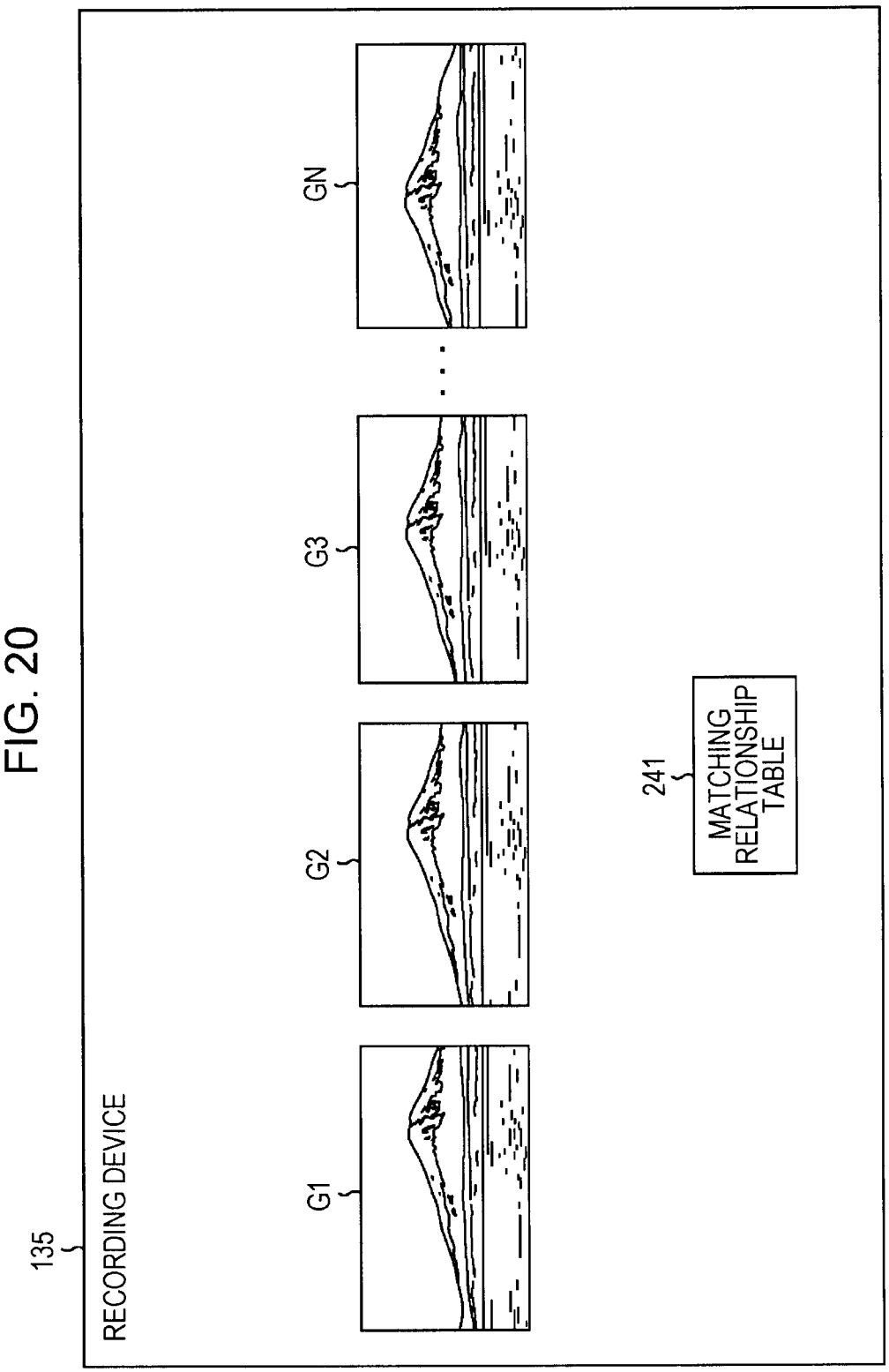
FIG. 20 is a diagram illustrating an example of the recording contents of the recording device.

FIG. 20 illustrates an example of recording contents of the recording device 135.

The image recorded in the recording device 135 is a panorama image in the first embodiment. On the contrary, in the second embodiment, as shown in FIG. 20, a plurality of continuous shot images is recorded in the recording device 135. That is, data on the continuous shot images G1 to GN (where, N is an integer equal to or larger than 2), each of which contains the object slowly shifting in the horizontal direction as the imaging apparatus 91 moves in the horizontal direction during the continuous shot, are recorded in the recording device 135.

Furthermore, data on the matching relationship table 241 are recorded in the recording device 135. The matching relationship table 241 represents a matching relationship between the disparity d and the continuous shot images extracted as the left-eye or right-eye images. That is, out of N continuous shot images G1 to GN, two continuous shot images selected as the left-eye or right-eye images are previously defined for each disparity d, and the defined contents are represented in the matching relationship table 241.

Image Recording Process

Next, the image recording process executed by the recording processing unit 161 during the continuous shot will be described with reference to FIG. 21.

Figure 21:
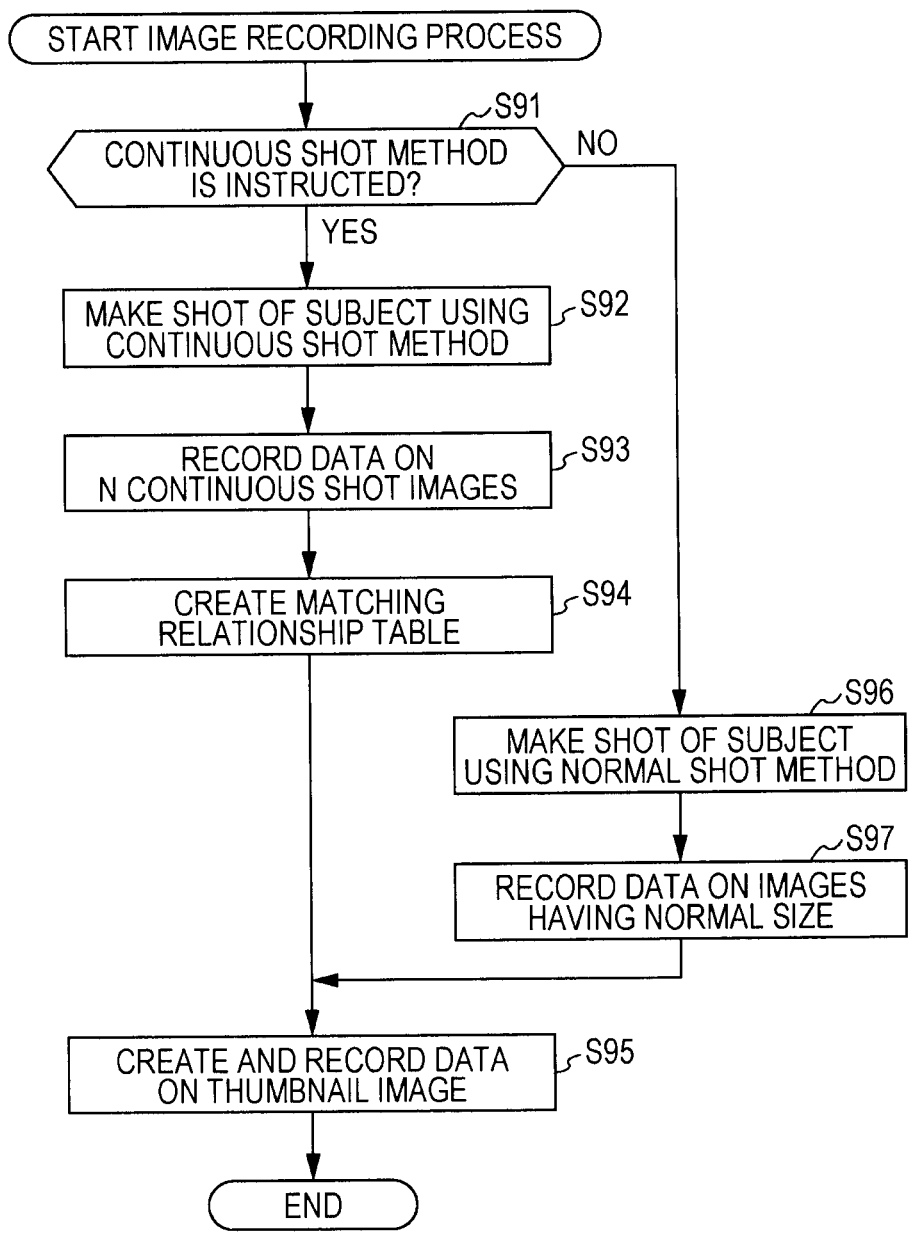
FIG. 21 is a flowchart illustrating an example of the image recording process.

FIG. 21 is a flowchart illustrating an example of the image recording process executed by the recording processing unit 161 during the recording process continuous shot.

When a user selects the shot mode by manipulating the mode dial 117, the image recording process is initiated.

In the step S91, the determining unit 181 determines whether or not the continuous shot method is instructed.

In the present embodiment, in the case where a user selects the continuous shot method by pressing the manipulation button 118 while seeing the menu screen displayed on the liquid crystal pane 120, it is determined as YES in the step S91, and the process advances to the step S92.

In the step S92, the shot control unit 182 makes shots of the subject using the continuous shot method. That is, the shot control unit 182 makes shots of the subject using the continuous shot method by controlling the aforementioned shot unit, i.e., makes N shots of the subject for a fixed time interval by relatively moving the imaging apparatus 91 in the horizontal direction. As a result, data on the N continuous shot images G1 to GN are obtained as the data on the shot images, and the process advances to the step S93.

In the step S93, the recording instructing unit 183 controls the digital signal processing unit 134 to record the data on the N continuous shot images G1 to GN obtained as a result of the step S92 in the recording device 135.

In the step S94, the creating unit 184 creates the matching relationship table 241 and records it in the recording device 135.

In the step S95, the creating unit 184 creates the thumbnail image data for each of the continuous shot images G1 to GN and records them in the recording device 135. As a result, the image recording process is terminated.

In addition, in the case where the process of the step S92 is the same in every try, i.e., in the case where a moving speed or a movement distance of the imaging apparatus 91, a time interval of the N shots, or the like is the same in every try, the matching relationship table 241 may be previously created and recorded in the recording device 135. In this case, the process of the step S94 may be omitted.

Matching Relationship Table

Figures 22, 23:
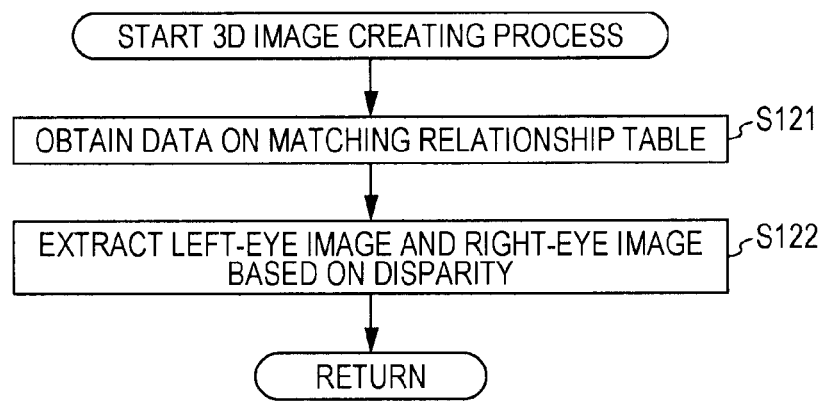
FIG. 22 is a diagram illustrating an example of the data structure of the matching relationship table.
FIG. 23 is a flowchart illustrating an example of the 3D image creation process.

FIG. 22 illustrates an example of a data structure of the matching relationship table 241.

In the present embodiment, since the matching relationship table 241 has a matrix structure, hereinafter, in FIG. 22, a set of the horizontal items are referred to as a row, and a set of the vertical items are referred to as a column. A predetermined row corresponds to a predetermined value of disparity d. That is, in a predetermined row, items such as "disparity," "left-eye image," and "right-eye image" are arranged for each disparity d corresponding to this row.

In the item "disparity" of a predetermined row, a value D corresponding to the disparity d of this row is stored.

In the item "left-eye image" of a predetermined row, in the case where the disparity d corresponding to this row has a value D, information for specifying the continuous shot image selected as the left-eye image out of the N continuous shot images G1 to GN (in FIG. 22, the number assigned to the image) is stored.

In the item "right-eye image" of a predetermined row, in the case where the disparity d corresponding to this row has a value D, information for specifying the continuous shot image selected as the right-eye image out of the N continuous shot images G1 to GN (in FIG. 22, the number assigned to the image) is stored.

In addition, in the example of FIG. 22, it is assumed that a displacement amount of the horizontal arrangement position of the same object included in each of the continuous shot image GK (K denotes any integer number selected from 1 to N−1) and the continuous shot image G(K+1) corresponds to the difference amount (for a single value) between the value D of the disparity d (D is an integer value equal to or larger than 1) and the value (D+1).

In addition, it is assumed that the aforementioned description regarding the matching relationship table 241 is also similarly applied to the example of FIG. 26 described below.

As apparent from the matching relationship table 241 of the example of FIG. 22, in the case where the value of disparity d is "1," the continuous shot image G2 (second shot image) is selected as the left-eye image, and the continuous shot image G3 (third shot image) is selected as the right-eye image. Here, in the present embodiment, it is assumed that the continuous shot image G2 is set to a representative image R (EXIF standard) determined when the shot is made using the continuous shot method. In addition, a value D of disparity d selected such that the continuous shot image G2, which is the representative image R, is selected as the left-eye image, and the continuous shot image G3 captured in the immediately subsequent try after the continuous shot image G2 is selected as the right-eye image, i.e., "1," is set to the default value.

In the case where the value D of the disparity d is equal to or larger than "2," the left-eye and right-eye images are selected by alternately and repeatedly applying the following selection method of patterns 1 and 2 whenever the value D of the disparity d increases by one. In other words, the matching relationship table 241 of the example of FIG. 22 is created through the process of the step S94 based on the requirement "the following selection methods of patterns 1 and 2 are alternately and repeatedly applied whenever the value D of the disparity d increases by one."

The selection method of pattern 1 refers to a method of selecting the left-eye and right-eye images as described below. In other words, the continuous shot image similar to that selected using the value D of the disparity d decremented by one is selected as the left-eye image. In addition, if the continuous shot image GK is selected as the right-eye image using the value D of the disparity d decremented by one, the continuous shot image G(K+1) captured in the immediately subsequent try is selected.

The selection method of pattern 2 refers to a method of selecting the left-eye and right-eye images as described below. In other words, if the continuous shot image GK is selected as the value D of the disparity d decremented by one, the continuous shot image G(K−1) captured in the attempt immediately previous is selected as the left-eye image. The continuous shot image similar to that selected using the value D of the disparity d decremented by one is selected as the right-eye image.

Specifically, for example, in the case where the value D of the disparity d is incremented from "1" to "2," the continuous shot image G2 similar to that selected when the value D of the disparity d is "1" is selected as the left-eye image through the selection method of pattern 1. In addition, in the case where the value D of the disparity d is "1," the continuous shot image G3 is selected as the right-eye image. Therefore, the continuous shot image G4 captured in the immediately subsequent try is selected.

Furthermore, in the case where the value D of the disparity d is incremented from "2" to "3," since the continuous shot image G2 is selected as the left-eye image using the selection method of pattern 2 when the value D of the disparity d is "2," the continuous shot image G1 captured in the attempt immediately previous is selected. In addition, the continuous shot image G4 similar to that selected when the value D of the disparity d is "2" is selected as the right-eye image.

In the case where the value D of the disparity d is incremented from "3" to "4," the continuous shot image G1 similar to that selected when the value D of the disparity d is "3" is selected as the left-eye image using the selection method of pattern 1. In addition, since the continuous shot image G4 is selected as the right-eye image in the case where the value D of the disparity d is "3," the continuous shot image G5 captured in the immediately subsequent try is selected.

However, in the case where the continuous shot image G1 is selected as the left-eye image using a predetermined value of disparity d, it is difficult to apply the selection method of pattern 2 to the value subsequent to that predetermined value. Therefore, the selection method of pattern 1 is repeatedly applied. Inversely, in the case where the continuous shot image GN is selected as the right-eye image using a predetermined value of disparity d, it is difficult to apply the selection method of pattern 1 to the value subsequent to that predetermined value. Therefore, the selection method of pattern 2 is repeatedly applied.

Returning to the description of the flowchart of FIG. 21, in the step S95, the creating unit 184 creates the thumbnail image data on each of the continuous shot images G1 to GN and records them in the recording device 135. As a result, the image recording process is terminated.

In this manner, in the case where a user selects the continuous shot method, the N continuous shot images G1 to GN and the thumbnail image data thereof are recorded in the recording device 135. On the contrary, in the case where a user selects the normal shot method, in the step S91, it is determined that the continuous shot method is not instructed, and the process advances to the step S96.

In the step S96, the shot control unit 182 makes a shot of the subject using a normal shot method by controlling the aforementioned shot unit. As a result, data on the image having a normal size are obtained as the data on the shot image, and the process advances to the step S97.

In the step S97, the recording instructing unit 183 records data on the image having a normal size obtained as a result of the process of the step S96 in the recording device 135 by controlling the digital signal processing unit 134. When the data on the image having a normal size are recorded in the recording device 135, the process advances to the step S95.

In the step S95, the creating unit 184 creates the thumbnail image data of the shot image (in this case, the image having a normal size) and records them in the recording device 135. As a result, the image recording process is terminated.

3D Image Creating Process

Next, the image display process executed by the image display processing unit 162 during the continuous shot will be described. Since the image display process of the present embodiment is basically similar to the image display process shown in FIG. 16, descriptions of the similar parts will be omitted, and only the 3D image creating process of the step S42, which is a difference, will be described.

FIG. 23 is a flowchart illustrating an example of the 3D image creating process using the 3D image creation processing unit 163 for the continuous shot image.

In the step S41 of FIG. 16, as the disparity d is set based on the depth information at the time point when the pressing of the zoom button 116 is released, the process advances to the 3D image creating process of the step S42, and the process of the flowchart of FIG. 23 is executed.

That is, in the step S121, the data acquisition unit 221 obtains data on the matching relationship table 241 from the recording device 135.

In the step S122, the extracting unit 223 extracts data on each of the left-eye and right-eye images based on the data on the matching relationship table 241 obtained through the process of the step S121 and the disparity d. In this case, the value of disparity d is set based on the depth information at the time point when a user releases the pressing of the zoom button 116 in the process of the step S40 of FIG. 16. In other words, the extracting unit 223 extracts two continuous shot images corresponding to the set value of disparity d as data on each of the left-eye and right-eye images using the matching relationship table 241 obtained through the process of the step S121 and the set value of disparity d. When the data on the left-eye and right-eye images are extracted, the 3D image creating process is terminated, and the process advances to the step S43 of FIG. 16.

Hereinafter, a specific example of the 3D image creating process will be described with reference to FIGS. 24 and 25.

Figure 24:
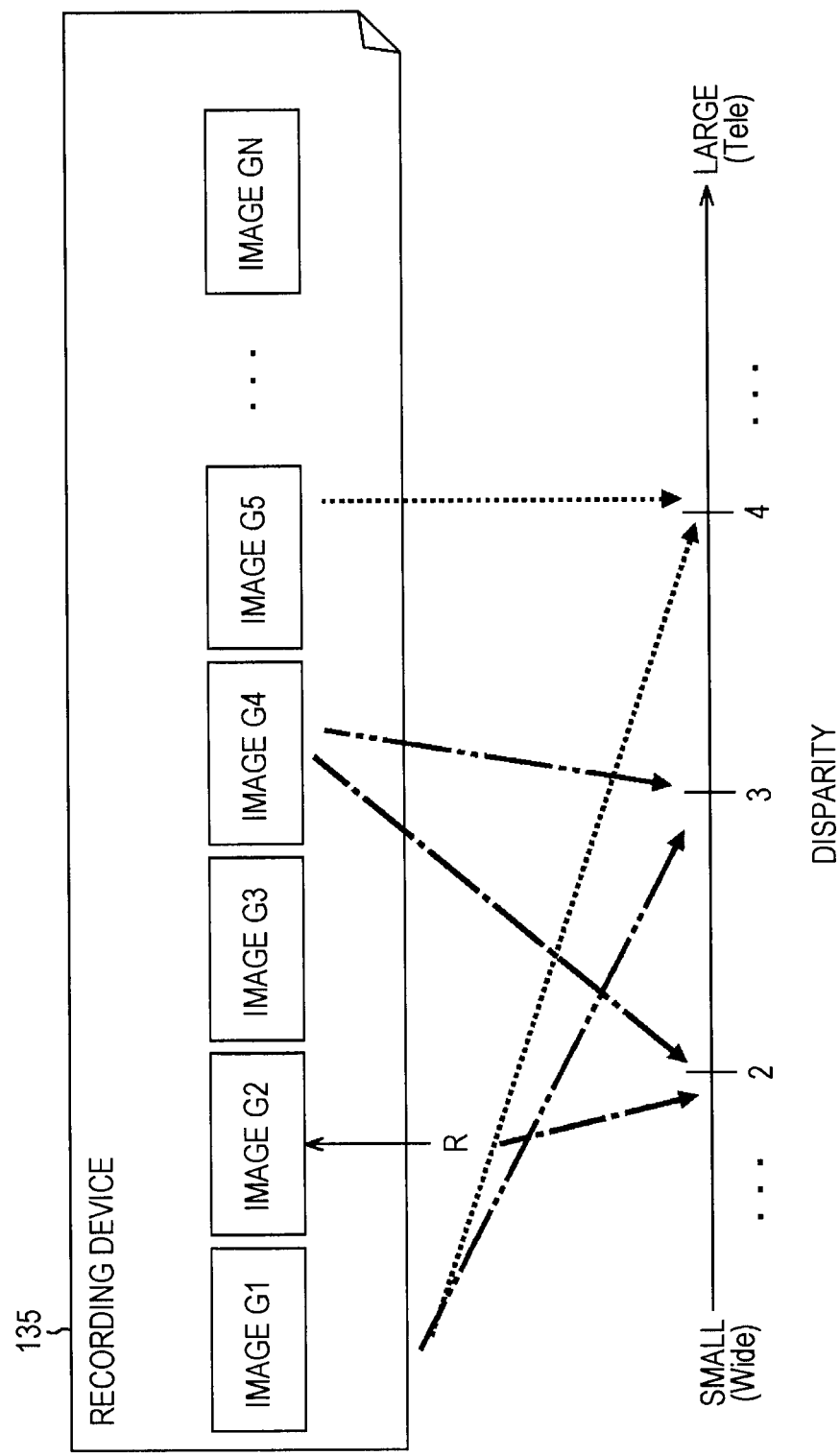
FIG. 24 is a diagram illustrating an example of a process of extracting the left-eye and right-eye images.
Figure 25:
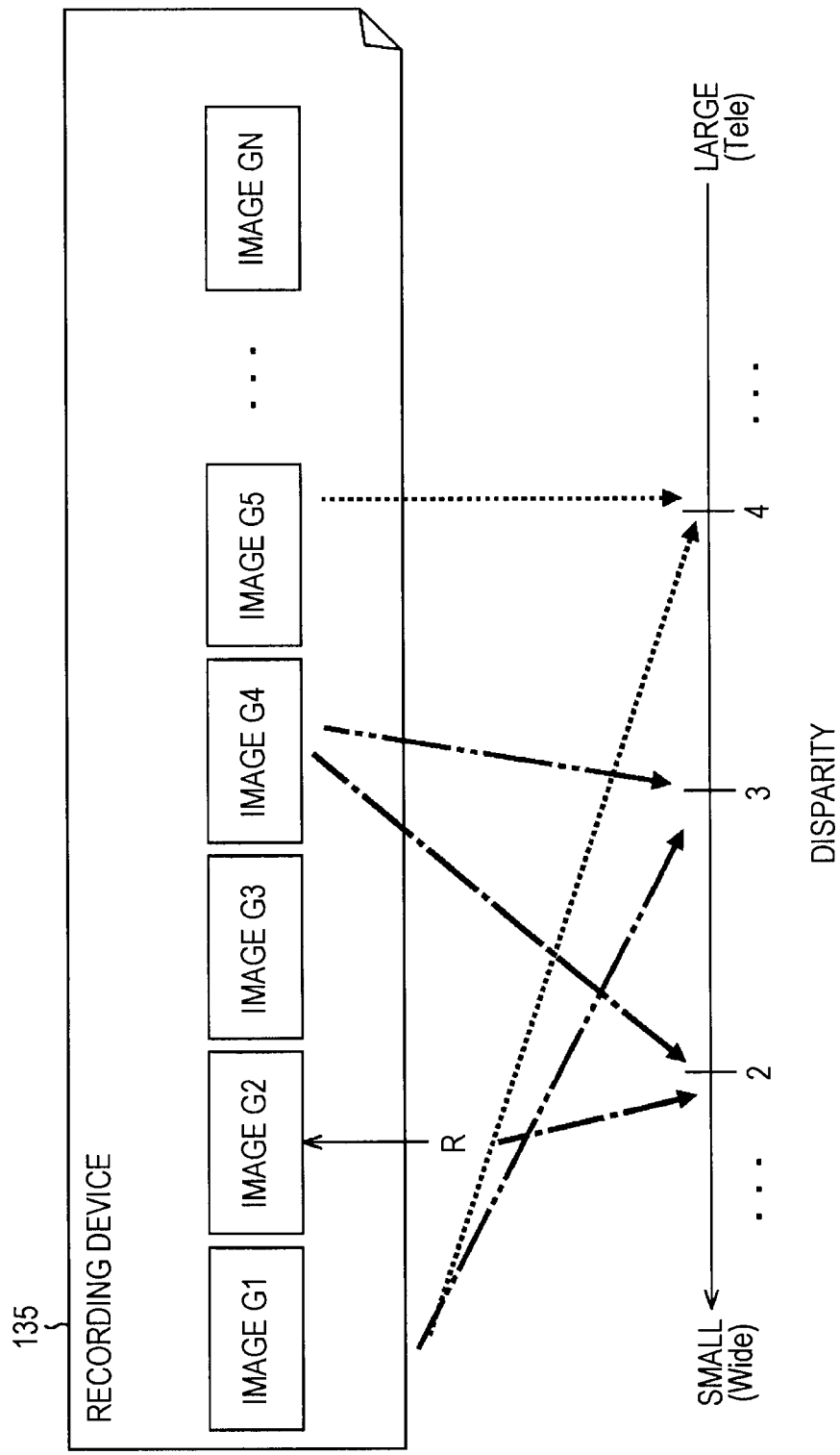
FIG. 25 is a diagram illustrating an example of a process of extracting the left-eye and right-eye images.

FIGS. 24 and 25 illustrate a specific example of a process of extracting the left-eye and right-eye images using the matching relationship table 241 in the example of the FIG. 22.

Data on the N continuous shot images G1 to GN obtained using a continuous shot method are recorded in the recording device 135 of FIG. 24. In addition, the horizontal axis denotes the value of disparity d. When the T-button of the zoom button 116 is pressed, the value of disparity d increases. In other words, as shown in FIG. 24, the value of disparity d changes along the right direction of the drawing.

For example, it is assumed that the value of disparity d set based on the depth information through the process of the step S41 of FIG. 16 is "1." In this case, as the data on the matching relationship table 241 of FIG. 22 are obtained through the process of the step S121 of FIG. 23, the data on the continuous shot image G2, which is a representative image R, are extracted as data on the left-eye image, and data on the continuous shot image G3 are extracted as the right-eye image in the process of the subsequent step S122. In addition, in the process of the step S43 of FIG. 16, the continuous shot image G2 is displayed as the left-eye image, and the continuous shot image G3 is displayed as the right-eye image on the liquid crystal panel 120.

When the T-button of the zoom button 116 is pressed in this state, it is determined as YES in the process of the step S44 of FIG. 16, and the process returns to the step S37. Through the process of the steps S37 to S41, the depth information value is set to increase, and the value of disparity d is also set to increase accordingly. For example, it is assumed that the value of disparity d set based on the depth information through the process of the step S41 of FIG. 16 is "2." In this case, when the data on the matching relationship table 241 of FIG. 22 are obtained through the process of the step S121 of FIG. 23, in the process of the subsequent step S122, the data on the continuous shot image G2, which is a representative image R, are extracted as the data on the left-eye image, and the data on the continuous shot image G4 are extracted as the right-eye image. In addition, through the process of the step S43 of FIG. 16, the continuous shot image G2 is displayed as the left-eye image, and the continuous shot image G4 is displayed as the right-eye image on the liquid crystal panel 120.

In the case where the value of disparity d is set to, for example, "3" as a result of repeating the same process by further pressing the T-button in this state, data on the continuous shot image G1 are extracted as the left-eye image, and the data on the continuous shot image G4 are extracted as the right-eye image based on the matching relationship table 241 of FIG. 22. In the case where the value of disparity d is set to, for example, "4" by further pressing the T-button, data on the continuous shot image G1 are extracted as the left-eye image, and data on the continuous shot image G5 are extracted as the right-eye image.

FIG. 25 illustrates a specific example of the process of extracting the left-eye and right-eye images when the W-button of the zoom button 116 is pressed in a state where the disparity d shown in FIG. 24 is set to "4."

Similar to FIG. 24, data on the N continuous shot images G1 to GN obtained using the continuous shot method are recorded in the recording device 135 of FIG. 25. In addition, the horizontal axis denotes the value of disparity d. When the W-button of the zoom button 116 is pressed, the value of disparity d decreases. In other words, as shown in FIG. 25, the value of disparity d changes along the left direction of the drawing.

For example, in the case where the value of disparity d is set to "4" in FIG. 24, the continuous shot image G1 is extracted as the left-eye image, and the continuous shot image G5 is extracted as the right-eye image, the continuous shot image G1 is displayed as the left-eye image, and the continuous shot image G5 is displayed as the right-eye image on the liquid crystal panel 120 through the process of the step S43 of FIG. 16.

When the W-button of the zoom button 116 is pressed in this state, it is determined as YES in the process of the step S44 of FIG. 16, so that the process returns to the step S37, and the depth information value is set to decrease through the process of the steps S37 to S41. Accordingly, the value of disparity d is set to decrease. For example, it is assumed that the value of disparity d set based on the depth information through the process of the step S41 of FIG. 16 is "3." In this case, when the data on the matching relationship table 241 of FIG. 22 are obtained through the process of the step S121 of FIG. 23, data on the continuous shot image G1 are extracted as data on the left-eye image, and data on the continuous shot image G4 are extracted as the right-eye image in the process of the next step S122. In addition, through the process of the step S43 of FIG. 16, the continuous shot image G1 is displayed as the left-eye image, and the continuous shot image G4 is displayed as the left-eye image on the liquid crystal panel 120.

In the case where the value of disparity d is set to, for example, "2" as a result of repeating the same process by further pressing the W-button in this state, data on the continuous shot image G2, which is a representative image R, are extracted as the left-eye image, and data on the continuous shot image G4 are extracted as the right-eye image.

In addition, the matching relationship table created in the process of the step S94 of FIG. 21 is not limited to the matching relationship table of FIG. 22, but may be, for example, the matching relationship table of FIG. 26.

FIG. 26 illustrates another example of the data structure of the matching relationship table 241.

As apparent from the matching relationship table 241 of FIG. 26, in the case where the value of disparity d is "1," the continuous shot image G2 is extracted as the left-eye image, and the continuous shot image G3 is extracted as the right-eye image. Here, as described above, in the present embodiment, the continuous shot image G2 is the representative image R (EXIF standard) determined when the continuous shot image G2 is captured using the continuous shot method. In addition, the value of disparity d, by which the continuous shot image G2, which is the representative image R, is selected as the left-eye image, and the continuous shot image G3 captured in the immediately subsequent try after the continuous shot image G2 is selected as the right-eye image, i.e., "1" is set to the default value.

In the case where the value of disparity d is equal to or larger than "2," the left-eye and right-eye images are selected by applying the following selection method. That is, in the selection method applied to the matching relationship table 241 in the example of FIG. 26, the left-eye and right-eye images are selected as follows. That is, the continuous shot image G2, which is the representative image R, is selected as the left-eye image. On the other hand, if the continuous shot image GK is selected using the value of disparity d decremented by one, the continuous shot image G(K+1) captured in the immediately subsequent try is selected as the right-eye image.

Specifically, for example, in the case where the value of disparity d is incremented from "1" to "2," the continuous shot image G2, which is the representative image R, is selected as the left-eye image using the selection method applied to the matching relationship table 241 in the example of FIG. 26. In addition, since the continuous shot image G3 is selected as the right-eye image when the value of disparity d is "1," the continuous shot image G4 captured in the immediately subsequent try is selected.

Furthermore, in the case where the value of disparity d is incremented from "2" to "3," the continuous shot image G2, which is the representative image R, is selected as the left-eye image using the selection method applied to the matching relationship table 241 in the example of FIG. 26. In addition, since the continuous shot image G4 is selected as the right-eye image when the value of disparity d is "2," the continuous shot image G5 captured in the immediately subsequent try is selected.

However, in the case where the continuous shot image GN is selected as the right-eye image using a predetermined value of disparity d, it is difficult to apply the selection method applied to the matching relationship table 241 in the example of FIG. 26 using the value subsequent to the predetermined value. Therefore, the continuous shot image G1 captured in the attempt immediately previous the continuous shot image G2, which is the representative image R, is selected as the left-eye image.

Specifically, in the case where the continuous shot image GN is selected as the right-eye image using a predetermined value "m" of the disparity d, the continuous shot image G1 captured in the attempt immediately previous the continuous shot image G2, which is the representative image R, is selected as the left-eye image when the value of disparity d is incremented from "m" to "m+1." The value "m+1" is the maximum value of disparity d.

Figure 27:
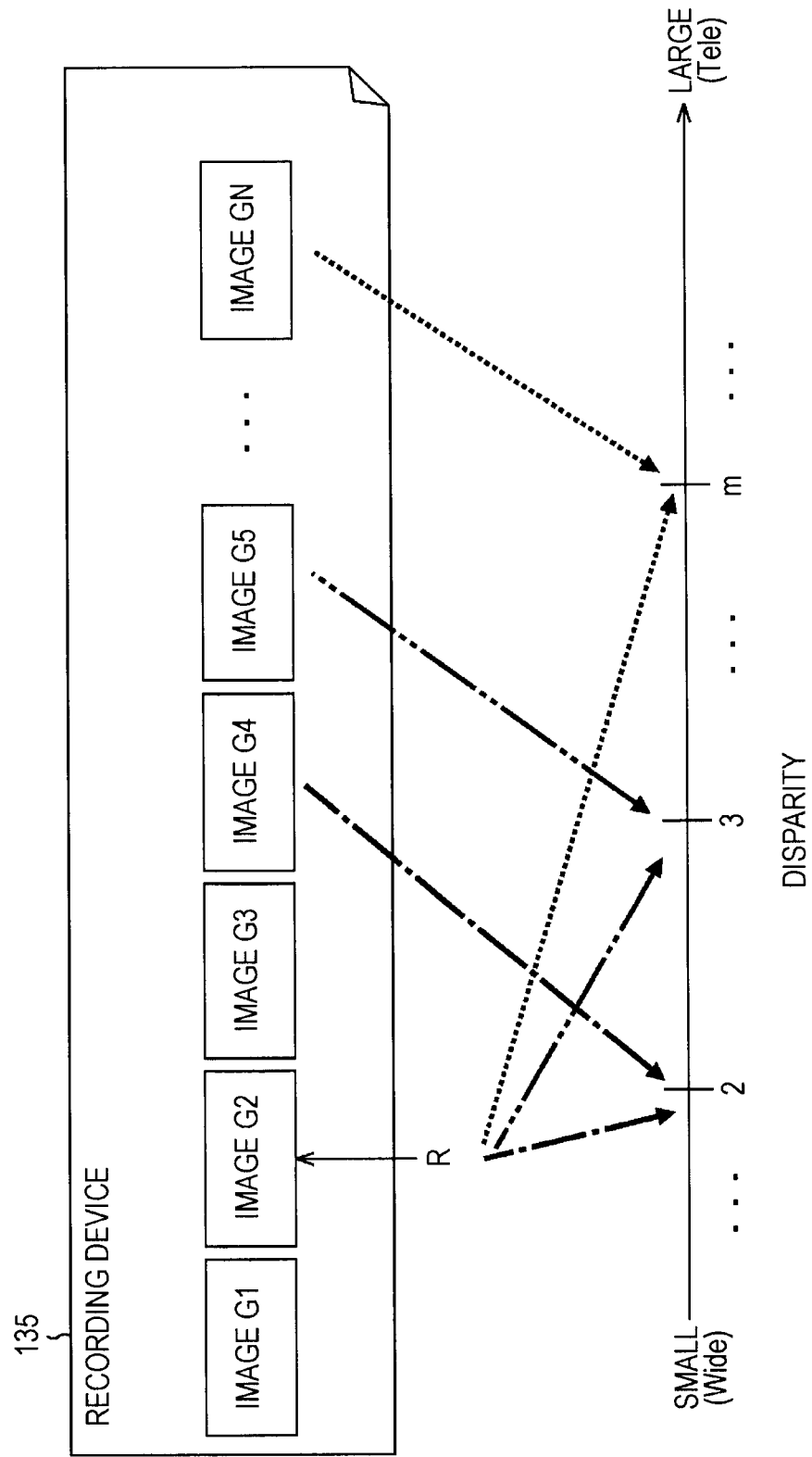
FIG. 27 is a diagram illustrating an example of a process of extracting the left-eye and right-eye images.
Figure 28:
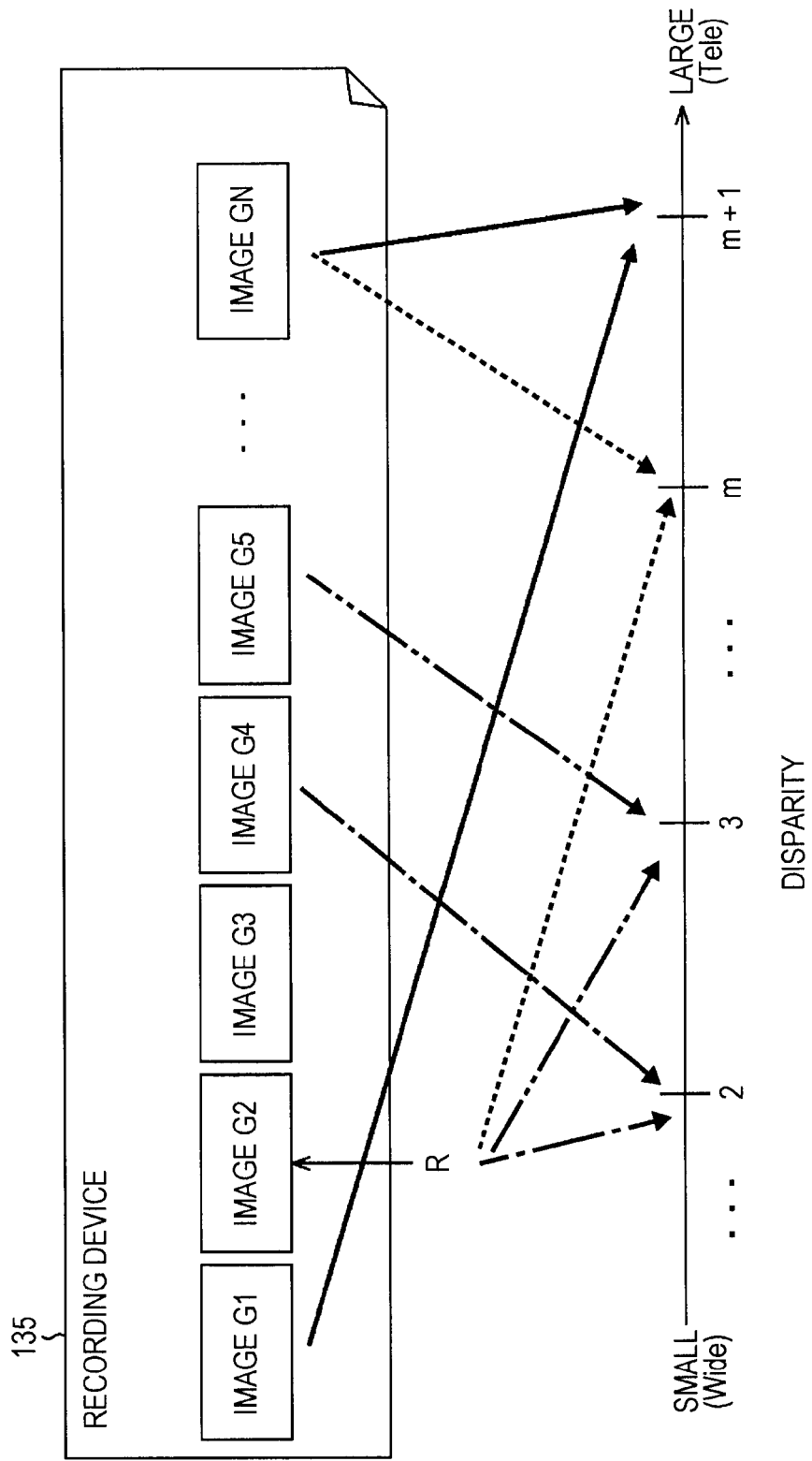
FIG. 28 is a diagram illustrating an example of a process of extracting the left-eye and right-eye images.

FIGS. 27 and 28 illustrate an example of a specific processing result of the process of extracting the left-eye and right-eye images using the matching relationship table 241 of FIG. 26.

In FIG. 27, data on the N continuous shot images G1 to GN obtained using the continuous shot method are recorded in the recording device 135. In addition, the horizontal axis denotes the value of disparity d. When the T-button of the zoom button 116 is pressed, the value of disparity d increases. In other words, as shown in FIG. 27, the value of disparity d changes along the right direction in the drawing.

For example, it is assumed that the value of disparity d set based on the depth information through the process of the step S41 of FIG. 16 is "1." In this case, when the data on the matching relationship table 241 of FIG. 26 are obtained through the process of the step S121 of FIG. 23, the data on the continuous shot image G2, which is the representative image R, are extracted as the left-eye image, and the data on the continuous shot image G3 are extracted as the right-eye image in the process of the next step S122. Through the process of the step S43 of FIG. 16, the continuous shot image G2 is displayed as the left-eye image, and the continuous shot image G3 is selected as the right-eye image on the liquid crystal panel 120.

When the T-button of the zoom button 116 is pressed in this state, it is determined as YES in the process of the step S44 of FIG. 16, so that process returns to the step S37, and the depth information value is set to increase through the process of the steps S37 to S41. Accordingly, the value of disparity d is also set to increase. For example, it is assumed that the value of disparity d set based on the depth information through the process of the step S41 of FIG. 16 is "2." In this case, when the matching relationship table 241 of FIG. 26 is obtained through the process of the step S121 of FIG. 23, data on the continuous shot image G2, which is the representative R, are extracted as the data on the left-eye image, and the data on the continuous shot image G4 are extracted as the right-eye image in the process of the next step S122. In addition, in the process of the step S43 of FIG. 16, the continuous shot image G2 is displayed on the left-eye image, and the continuous shot image G4 is displayed as the right-eye image on the liquid crystal panel 120.

In the case where the value of disparity d is set to, for example, "3" as a result of repeating the same process by further pressing the T-button in this state, the data on the continuous shot image G2, which is the representative image R, are extracted as the left-eye image, and the data on the continuous shot image G5 are extracted as the right-eye image. In the case where the value of disparity d is set to, for example, "m" by further pressing the T-button, the data on the continuous shot image G2, which is the representative image R, are extracted as the left-eye image, and the data on the continuous shot image GN are extracted as the right-eye image.

FIG. 28 illustrates a specific example of a process of extracting left-eye and right-eye images in the case where the T-button of the zoom button 116 is further pressed in a state where the disparity d shown in FIG. 27 is set to "m."

Data on the N continuous shot images G1 to GN obtained using the continuous shot method as in FIG. 27 are recorded in the recording device 135 of FIG. 28. In addition, the horizontal axis denotes the value of disparity d. When the T-button of the zoom button 116 is pressed, the value of disparity d increases.

For example, in the case where the value of disparity d is set to "m" in FIG. 27, the data on the continuous shot image G2, which is the representative image R, are extracted as the left-eye image, and the data on the continuous shot image GN are extracted as the right-eye image, the continuous shot image G2 is displayed as the left-eye image, and the continuous shot image GN is displayed as the right-eye image on the liquid crystal panel 120 in the process of the step S43 of FIG. 16.

When the T-button of the zoom button 116 is pressed in this state, it is determined as YES in the process of the step S44 of FIG. 16, and the process returns to the step S37. In addition, through the process of the steps S37 to S41, the depth information value is set to increase, and the value of disparity d is also set to increase accordingly.

For example, it is assumed that the value of disparity d set based on the depth information is set to "m+1" in the process of the step S41 of FIG. 16. In this case, when the matching relationship table 241 of FIG. 26 is obtained in the process of the step S121 in FIG. 23, the data on the continuous shot image G1 are extracted as the left-eye image, and the data on the continuous shot image GN are extracted as the right-eye image in the process of the next step S122. In addition, the continuous shot image G1 is displayed as the left-eye image, and the continuous shot image GN is displayed as the right-eye image on the liquid crystal panel 120 in the process of the step S43 of FIG. 16.

In this manner, when the image display process is executed, the disparity d is set based on the pressing manipulation of the zoom button 116, and the object is displayed in 3D space with the depth-height degree corresponding to the set disparity d. Specifically, for example, when the T-button of the zoom button 116 is pressed, the depth information value increases, and the disparity d is also set to increase accordingly, so that a combination of the selected right-eye and left-eye images has a large difference between the numbers assigned to the images. As a result, the depth-height degree of the object displayed in 3D space increases. On the contrary, when the W-button of the zoom button 116 is pressed, the depth information value decreases, and the disparity d is also set to a smaller value accordingly, so that a combination of the selected right-eye and left-eye images has a small difference between the numbers assigned to the images. As a result, the depth-height degree of the object displaced in 3D space decreases. That is, a user is capable of adjusting the depth-height degree of the object displayed in 3D space just by performing an intuitive manipulation using the manipulation unit, called the zoom button 116, for manipulating the depth direction of the 2D image.

3. Third Embodiment

As described above, in the first embodiment, the 3D image data are created from the panorama image data obtained as a result of making a shot using the panorama shot method. In addition, in the second embodiment, data on two images selected from data on a plurality of images obtained as a result of making shots using the continuous shot method are created as the 3D image data. That is, in the first and second embodiments, the 3D image data are created such that the object included in the shot image is displayed in 3D space. On the contrary, in the third embodiment, the 3D image data are created by using the shot image as a background image and synthesizing data on a stamp image with the data on such a background image. In other words, in the third embodiment, the 3D image is created such that at least the object included in the stamp image is displayed in 3D space.

Since the configuration of the imaging apparatus 91 of the third embodiment is basically similar to that of the first embodiment shown in FIGS. 10 and 11, descriptions of the similar parts will be omitted, and the recording device 135, which is a difference therebetween, will be solely described.

Although not shown in the drawings, the data on the image having a normal size are recorded in the recording device 135 of imaging apparatus 91 of the third embodiment. Such a shot image is used as the background images of the left-eye and right-eye images (hereinafter, referred to as a left-eye background image and a right-eye background image, respectively) created as the 3D image.

In this case, while it is necessary that a pair of the left-eye background image and the right-eye background image include the corresponding object, the object may be arranged in the same position or displaced in the horizontal direction by a predetermined value of disparity d.

For example, the data on the image having a normal size obtained as a result of making a shot using a normal shot method may be directly employed as each of the right-eye and left-eye background images. In this case, since the object is arranged in the same position, the corresponding object is not displayed in 3D space, and only the object of the stamp image described below is displayed in 3D space.

Meanwhile, for example, in the first or second embodiment, the image having a normal size created as the left-eye image from the shot image may be employed as the left-eye background image, and the image having a normal size created as the right-eye image from the shot image may be employed as the right-eye background image. In this case, since the object is displaced in the horizontal direction by a predetermined value of the disparity d between the left-eye and right-eye background images, the corresponding object is displayed in 3D space with the depth-height degree corresponding to the disparity d. In this case, the corresponding object included in the left-eye and right-eye background images is displayed in 3D space along with the object of the stamp image described below.

Hereinafter, the corresponding object included in the left-eye and right-eye background images will be referred to as a background object. On the contrary, the object of the stamp image described below will be referred to as a foreground object.

The stamp image data synthesized with the data on such left-eye and right-eye background images are recorded in the recording device 135. The foreground object is included in the stamp image, and other areas are transparent. There is not just a single such stamp image, and the data on a plurality of stamp images in which the same foreground object is arranged in slowly displaced positions in the horizontal direction are stored in the recording device 135. The data on the left-eye image are created by synthesizing the stamp image data including the foreground object arranged in a predetermined position out of such a plurality of stamp images with the data on the left-eye background image. Meanwhile, the data on the right-eye image are created by synthesizing the stamp image data including the foreground object arranged in a displaced position in the horizontal direction by the disparity d from a predetermined position with the data on the right-eye background image. Alternatively, a single stamp image may be used by displacing the synthesis position. Based on the data on each of the left-eye and right-eye images created in this manner, the foreground object is displayed in 3D space with the depth-height degree corresponding to the disparity d. In addition, whether or not the background object is displayed in 3D space is determined depending on the arrangement position of each background object within the left-eye and right-eye background images as described above.

Method of Creating 3D Image

A method of creating the 3D image according to the third embodiment will be described in detail with reference to FIGS. 29 and 30.

Figure 29:
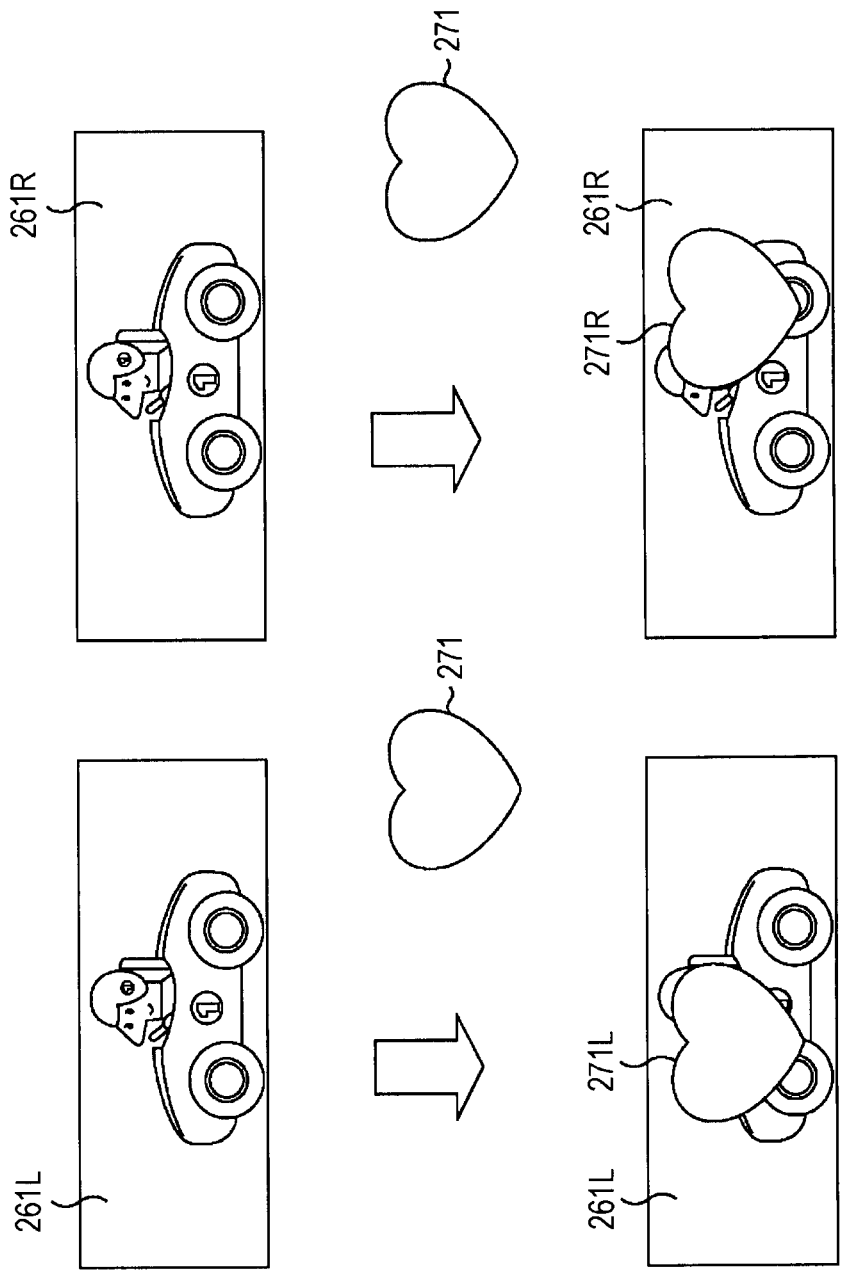
FIG. 29 is a diagram illustrating a method of creating a 3D image.
Figure 30:
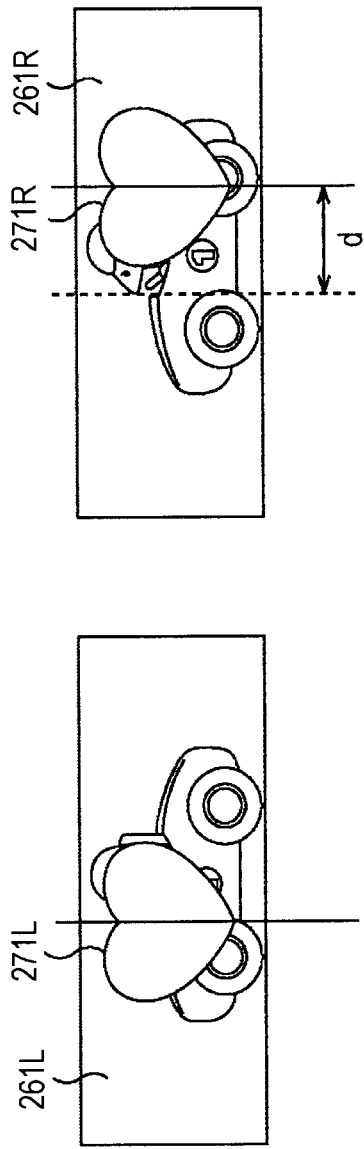
FIG. 30 is a diagram illustrating a method of creating a 3D image.

FIGS. 29 and 30 schematically illustrate a method of creating the 3D image according to the third embodiment.

Referring to FIG. 29, in each of the left-eye background image 261L and the right-eye background image 261R, an object representing a vehicle with a driver is included as the background object. In the example of FIG. 29, the same shot image is employed as each of the left-eye background image 261L and the right-eye background image 261R. That is, since the background objects within the left-eye background image 261L and the right-eye background image 261R are arranged in the same position, the background object is not displayed in 3D space.

In the third embodiment, the stamp image data are synthesized with the data on each of such left-eye and right-eye background images 261L and 261R. In addition, in FIG. 29, only the foreground object 271 having a heart shape included in the stamp image is shown, and the stamp image (transparent area) is not shown.

That is, the data on the left-eye image are created by synthesizing stamp image data, in which the foreground object 271L is arranged in a predetermined position, with data on the left-eye background image 261L. Similarly, the data on the right-eye image are created by synthesizing stamp image data, in which the foreground object 271R is arranged in a predetermined position, with data on the right-eye background image 261R. However, as shown in FIG. 30, the position where stamp image data including the foreground object 271R are synthesized with data on the right-eye background image 261R is displaced by the disparity d in the horizontal direction from the position where the left-eye background image 261L is inserted. Based on the data on the left-eye and right-eye images created in this manner, the foreground object 271 is displayed in 3D space with the depth-height degree corresponding to the disparity d.

Image Display Process in Third Embodiment

Next, an image display process using the method of creating a 3D image according to the third embodiment will be described.

Figure 31:
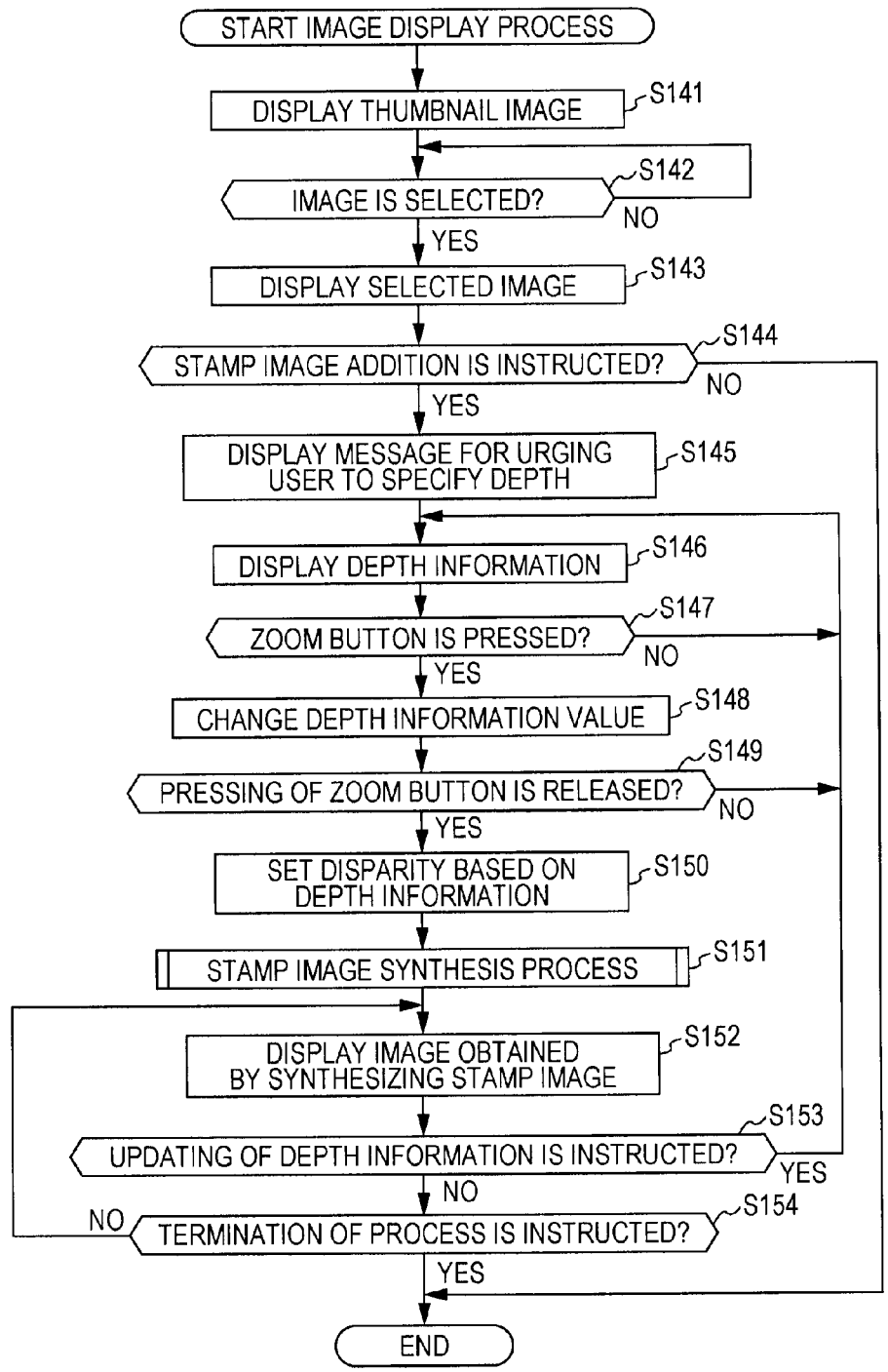
FIG. 31 is a flowchart illustrating an example of an image display process.

FIG. 31 is a flowchart illustrating an example of the image display process using the image display processing unit 162 according to the third embodiment.

When a user selects the image display mode by manipulating the mode dial 117, the image display process is initiated.

In the step S141, the display control unit 201 performs control to display the thumbnail image on the liquid crystal panel 120. Here, the thumbnail image displayed on the liquid crystal panel 120 is the thumbnail image of the background image.

In the step S142, the manipulation recognition unit 202 determines whether or not the thumbnail image displayed in the process of the step S141 is selected.

In the case where no thumbnail image is selected, it is determined as NO in the step S142, so that the process returns to the step S142, and the subsequent process is repeated. That is, the determining process of the step S142 is repeated until the thumbnail image is selected.

Then, in the case where a user selects predetermined one of the thumbnail images by pressing the manipulation button 118 while seeing the menu screen displayed on the liquid crystal panel 120, it is determined as YES in the step S142, and the process advances to the step S143.

In the step S143, the display control unit 201 performs control to display the image selected in the process of the step S142 on the liquid crystal panel 120. In other words, the original image of the thumbnail image is displayed.

In the step S144, the manipulation recognition unit 202 determines whether or not addition of the stamp image is instructed.

In the case where a user desires to add the stamp image while seeing the image displayed on the liquid crystal panel 120, i.e., the background image, a user performs manipulation for instructing stamp addition. In the present embodiment, a user selects addition of the stamp image by pressing the manipulation button 118 while seeing the menu screen displayed on the liquid crystal panel 120 as a manipulation of instructing stamp addition. Therefore, in the case where the manipulation button 118 is not pressed, it is determined that addition of the stamp image is not instructed, so that it is determined as NO in the step S144, and the image display process is terminated.

On the contrary, in the case where a user selects addition of the stamp image by pressing the manipulation button 118, it is determined that addition of the stamp image is instructed, so that it is determined as YES in the step S144, and the process advances to the step S145.

In addition, the process of the steps S145 to S150 is similar to the process of the steps S36 to S41 of FIG. 16, and descriptions thereof will be omitted.

As the disparity d is set based on the depth information at the time point when the pressing of the zoom button 116 is released in the step S150, the process advances to the step S151.

In the step S151, the 3D image creation processing unit 163 creates 3D image data including the foreground object of the stamp image based on the disparity d set in the process of the step S150. That is, data on the left-eye image are created by synthesizing the stamp image data including the foreground object arranged in a predetermined position with the data on the left-eye background image. Meanwhile, data on the right-eye image are created by synthesizing the stamp image data including the foreground object arranged in a displaced position in the horizontal direction by the disparity d from a predetermined position with the data on the right-eye background image. When the left-eye and right-eye images created in this manner are displayed, the foreground object is displayed in 3D space with the depth-height degree corresponding to the disparity d. In addition, whether or not the background object displayed in 3D space depends on each of the arrangement positions of the left-eye and right-eye background images of the background object as described above. Hereinafter, the process of the step S151 described above will be referred to as a stamp image synthesis process. The stamp image synthesis process will be described in detail with reference to FIG. 32.

In the step S152, the display control unit 201 performs control to display the image created by synthesizing the stamp image in the stamp image synthesis process of the step S151 on the liquid crystal panel 120. That is, the display control unit 201 performs control to display the left-eye and right-eye images, for example, as polarization images of the vertical direction and the horizontal direction, respectively, on the liquid crystal panel 120 as described above in conjunction with FIG. 8. In this state, a user is capable of recognizing the foreground object displayed in 3D, i.e., a state where the foreground object protrudes or recesses depending on the disparity d by wearing polarization glasses and seeing the polarization image. In addition, whether or not the background object is displayed in 3D space depends on each of the arrangement positions of the background object within the left-eye and right-eye background images as described above.

In the step S153, the manipulation recognition unit 202 determines whether or not update of the depth information is instructed.

In the present embodiment, in the case where a user desires to change the depth-height degree while seeing the foreground object displayed in 3D space, i.e., in the case where a user instructs an update of the depth information, a user presses the zoom button 116 again as a manipulation thereof. Therefore, in the present embodiment, in the case where the zoom button 116 is pressed while the 3D image is displayed on the liquid crystal panel 120, it is determined as YES in the step S153, so that the process returns to the step S146, and the subsequent process is repeated. That is, when an update of the depth information is instructed, the loop process including the steps S146 to S153 is repeated, and the disparity d is set again based on the updated depth information value, so that the depth-height degree of the foreground object of the displayed 3D image changes.

In the case where update of the depth information is not instructed, it is determined as NO in the step S153, and the process advances to the step S154.

In the step S154, the manipulation recognition unit 202 determines whether or not the process termination is instructed.

In the case where the process termination is not instructed, it is determined as NO in the step S154, and the process returns to the step S152, so that the subsequent process is repeated. That is, the loop process including the steps S152 to S154 is repeated as long as the process termination is not instructed, and the 3D image created through the stamp image synthesis process of the step S151 is displayed on the liquid crystal panel 120.

Then, in the case where the process termination is instructed, it is determined as YES in the step S154, and the image display process is terminated.

In this manner, when the image display process is executed, the disparity d is set based on the pressing manipulation of the zoom button 116, and the foreground object included in the stamp image is displayed in 3D space with the depth-height degree corresponding to the set disparity d.

Stamp Image Synthesis Process

Next, the stamp image synthesis process of the step S151 of the image display process of FIG. 31 will be described with reference to the flowchart of FIG. 32.

Figure 32:
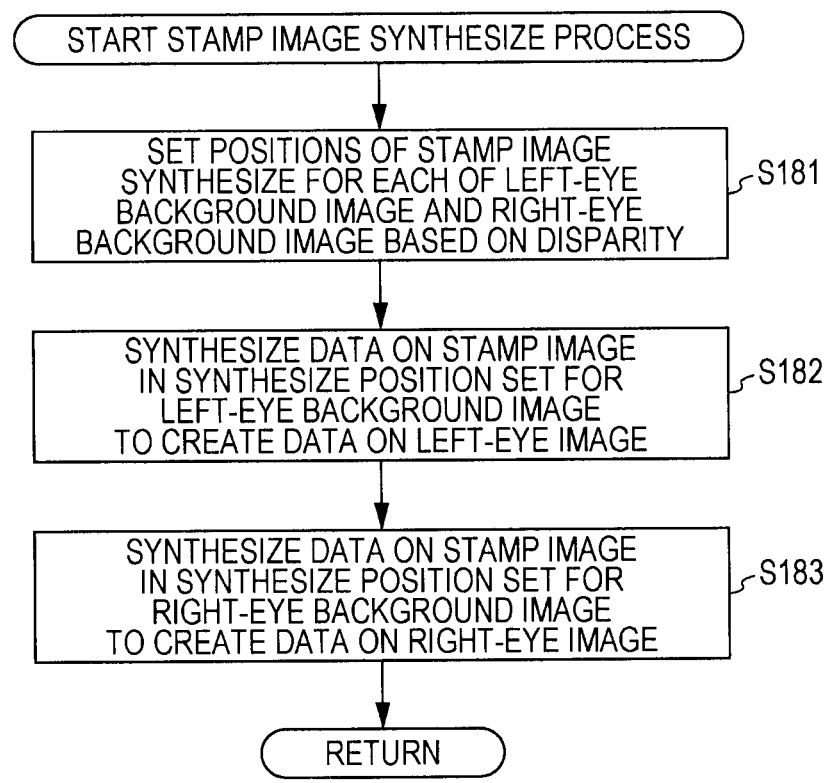
FIG. 32 is a flowchart illustrating an example of a stamp image synthesis process.

FIG. 32 is a flowchart illustrating an example of the stamp image synthesis process using the 3D image creation processing unit 163.

In the step S181, the setting unit 222 sets the synthesis position of the foreground object of the stamp image in each of the left-eye and right-eye background images based on the disparity d.

In the step S182, the creating unit 224 obtains stamp image data in which the foreground object is arranged in the position set as the synthesis position of the left-eye background image in the process of the step S181. In addition, the creating unit 224 creates data on the left-eye image by synthesizing the data on the obtained stamp image with the data on the left-eye background image.

Specifically, for example, in the example of FIG. 30 described above, the position indicated by the vertical solid line attracted over the left-eye background image 261L in the left of FIG. 30 is used as the synthesis position of the left-eye background image. Therefore, in the step S182, stamp image data in which the foreground object 271L having a heart shape is arranged in the synthesis position are obtained and synthesized with the data on the left-eye background image 261L. As a result, data on the left-eye image shown in the left of FIG. 30 are created.

In the step S183, the creating unit 224 obtains stamp image data in which the foreground object is arranged in the position set as the synthesis position of the right-eye background image in the step S181. In addition, the creating unit 224 creates the data on the right-eye image by synthesizing the data on the obtained stamp image with the data on the right-eye background image.

Specifically, for example, in the example of FIG. 30 described above, the position indicated by the vertical solid line attracted over the right-eye background image 261R in the right of FIG. 30, i.e., the position displaced in the horizontal right direction by the disparity d from the position indicated by the vertical dashed line (synthesis position of the left-eye background image) is used as the synthesis position of the right-eye background image. Therefore, in the step S183, stamp image data in which the foreground object 271R having a heart shape is arranged in the synthesis position are obtained and synthesized with the data on the right-eye background image 261R. As a result, data on the right-eye image shown in the right of FIG. 30 are created.

When the data on the left-eye image and the data on the right-eye image are created, the stamp image synthesis process is terminated, and the process advances to the step S152 of FIG. 31.

In addition, the size of the stamp image recorded in the recording device 135 is equal to the size of the background image in the aforementioned example, but the present invention is not limited thereto. For example, the rectangular size surrounding the foreground object (object having a heart shape in the example of FIG. 29), i.e., the size smaller than the background image may be set to the size of the stamp image. In this case, the data on only a single stamp image may be recorded in the recording device 135. In this case, the creating unit 224 may execute the following process as the process of the step S182 of FIG. 32. In other words, the creating unit 224 synthesizes the stamp image data with the data on the left-eye background image such that the stamp image (foreground object) is arranged in the synthesis position of the left-eye background image. Similarly, the creating unit 224 may execute the following process as the process of the step S183 of FIG. 32. The creating unit 224 synthesizes the stamp image data with the data on the right-eye background image such that the stamp image (foreground object) is arranged in the set synthesis position of the right-eye background image.

When the image display process is executed in this manner, the disparity d is set based on the pressing manipulation of the zoom button 116, and at least the foreground object of the stamp image is displayed in 3D space with the depth-height degree corresponding to the set disparity d. Specifically, for example, when the T-button of the zoom button 116 is pressed, the depth information value increases, and the disparity d is also set to a large value accordingly. As a result, the depth-height degree of the foreground object displayed in 3D space increases. On the contrary, when the W-button of the zoom button 116 is pressed, the depth information value decreases, and the disparity d is also set to a small value accordingly. As a result, the depth-height degree of the foreground object displayed in 3D space decreases. That is, a user is capable of adjusting the depth-height degree of the foreground object displayed in 3D space just by performing an intuitive manipulation using the manipulation unit, i.e., called the zoom button 116, for manipulating the depth direction of the 2D image.

Manipulation Using Touch Panel 121

Figure 33A:
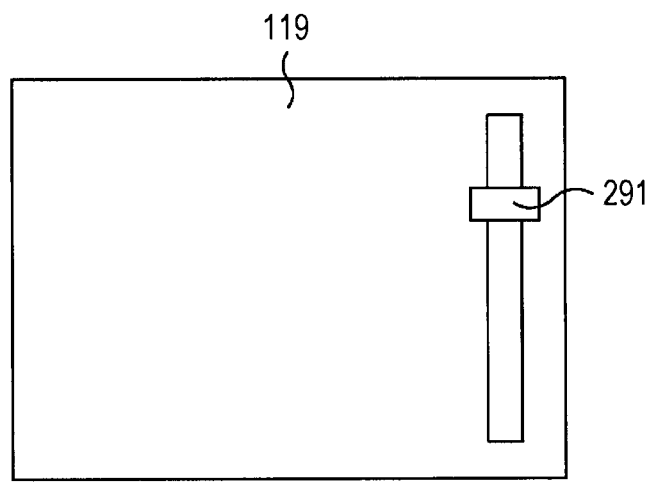
FIGS. 33A and 33B are diagrams illustrating a display example of the manipulation unit.
Figure 33B:
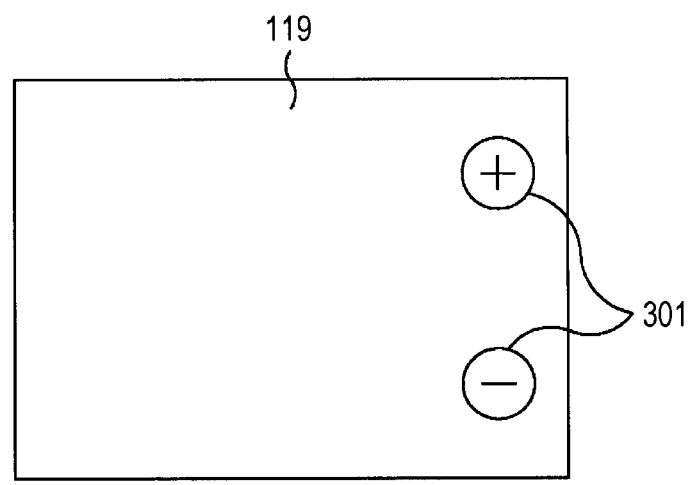

FIGS. 33A and 33B illustrate an example of displaying the manipulation unit using the liquid crystal panel 120 included in the touch screen 119.

In the example of FIG. 33A, a slide bar 291 is displayed on the liquid crystal panel 120 included in the touch screen 119. If a user touches the display position of the slide bar 291 with a finger or the like and upwardly or downwardly moves the finger or the like while maintaining the touch state, the locus of the finger or the like is detected by the touch panel 121 included in the touch screen 119. Then, the CPU 136 displays the image on the liquid crystal panel 120 by moving the slide bar 291 upwardly or downwardly based on the detection result. In this manner, a user can upwardly or downwardly move the slide bar 291 being displayed. Such a manipulation for upwardly or downwardly moving the slide bar 291 corresponds to the pressing manipulation of the T-button and the W-button of the zoom button 116. That is, the aforementioned first to third functions can be allocated to the slide bar 291. In other words, a function of manipulating the 2D image in the depth direction can be allocated. For example, in the case where the third function is implemented, the disparity d is set depending on the upward or downward movement of the slide bar 291, and the object is displayed in 3D space with the depth-height degree corresponding to the set disparity d. Specifically, for example, when the slide bar 291 moves upwardly, the depth information value increases, and the disparity d is also set to a larger value accordingly. As a result, the depth-height degree of the object displayed in 3D space increases. On the contrary, as the slide bar 291 moves downwardly, the depth information value decreases, and the disparity d is also set to a small value accordingly. As a result, the depth-height degree of the object displayed in 3D display decreases.

In the example of FIG. 33B, an adjustment button 301 including a plus button or a minus button is displayed on the liquid crystal panel 120 included in the touch screen 119. When a user presses, or touches the plus button or the minus button with a finger or the like, the touch position of the finger or the like is detected by the touch panel 121 included in the touch screen 119. Then, the CPU 136 detects the pressing manipulation of the plus button or the minus button based on the detection result. The plus button and the minus button of the adjustment button 301 correspond to the T-button and the W-button of the zoom button 116, respectively. That is, the aforementioned first to third functions can be allocated to the adjustment button 301. In other words, a function of manipulating the depth direction of the 2D image can be allocated. For example, in the case where the third function is implemented, the disparity d is set based on the pressing manipulation of the adjustment button 301, and the object is displayed in 3D space with the depth-height degree corresponding to the set disparity d. Specifically, for example, as the plus button of the adjustment button 301 is pressed, the depth information value increases, and the disparity d is also set to a larger value accordingly. As a result, the depth-height degree of the object displayed in 3D space increases. On the contrary, when the minus button of the adjustment button 301 is pressed, the depth information value decreases, and the disparity d is also set to a small value accordingly. As a result, the depth-height degree of the object displayed in 3D space decreases.

In this manner, a user may manipulate a software manipulation unit for manipulating the depth direction in the 2D image, such as the slide bar 291 or the adjustment button 301 displayed on the liquid crystal panel 120, by touching the touch panel 121 with a finger or the like. A user is capable of adjusting the depth-height degree of the object displayed in 3D space just by performing such an intuitive manipulation.

Example of 3D Display

Figure 35:
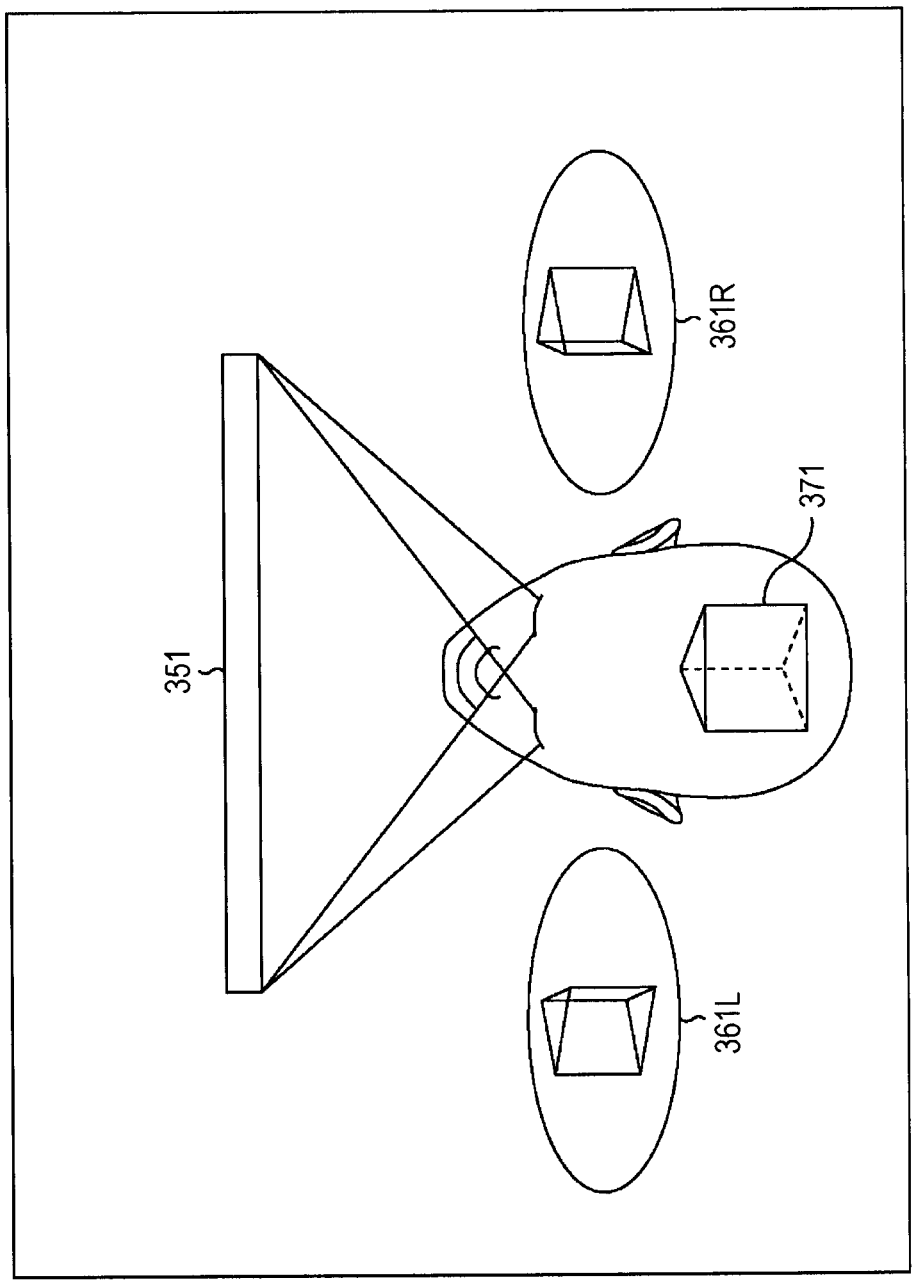
FIG. 35 illustrates another example of 3D display.

FIGS. 34 and 35 illustrate another example of 3D display using the left-eye image 41L and the right-eye image 41R.

FIG. 34 illustrates an example of 3D image display using shutter glasses 321.

Referring to FIG. 34, the image processing apparatus alternately switches and displays the left-eye image 41L and the right-eye image 41R in a time-division manner.

In this state, it is assumed that a user is wearing a set of shutter glasses 321 and sees the left-eye image 41L and the right-eye image 41R. The set of the shutter glasses 321 includes a left lens 331L and a right lens 331R alternately opened in a time-division manner in synchronization with display timings of the left-eye image 41L and the right-eye image 41R. That is, the left lens 331L is opened, and the right lens 331R is closed when the left-eye image 41L is displayed.

As a result, the left-eye image 41L is projected to the left eye of a user through the left lens 331L. Meanwhile, when the right-eye image 41R is displayed, the right lens 331R is opened, and the left lens 331L is closed. As a result, the right-eye image 41R is projected to the right eye of a user through the right lens 331R. As described above, in each of the left-eye image 41L and the right-eye image 41R, various objects (in the example of FIG. 34, objects such as a mountain or a lake) are separated by a predetermined value of disparity d. Therefore, a user can recognize that various objects are displayed in 3D space.

FIG. 35 illustrates an example of the 3D image display using directivity light.

Referring to FIG. 35, the display unit 351 may emit directivity light on a pixel-by-pixel basis. In this regard, the image processing apparatus (not shown) may project only the left-eye image 361L into the left eye and project only the right-eye image 361R into the right eye by controlling the direction of the light that is emitted from the display unit 351 and arrives at each of the left and right eyes of a user. Here, similar to each of the left-eye image 41L and the right-eye image 41R, it is assumed that various objects (in the example of FIG. 35, the object 371 having a triangular pole shape) in each of the left-eye image 361L and the right-eye image 361R are separated from each other by a predetermined value of disparity d. In this case, a user may recognize that various objects (in the example of FIG. 35, the object 371 having a triangular pole shape) are displayed in 3D space with the naked eye without wearing any special glasses.

The present invention may be applied to any apparatus capable of displaying an image with a manipulation unit for manipulating the depth direction, such as a digital camera, a personal computer, a mobile phone, or a photo frame having a touch panel.

The present application contains subject matter related to that disclosed in Japanese Priority Patent Application JP 2010-008132 filed in the Japan Patent Office on Jan. 18, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
circuitry configured to:
set disparity between left-eye and right-eye images for a 3D image based on a manipulation from a manipulation unit that allocates a value to a depth direction of a 2D image; and
create data on the left-eye and right-eye images in which a corresponding object is arranged in positions separated by the disparity set by the disparity setting unit by
obtaining image data,
classifying the image data into a plurality of processing units,
setting one of the processing units as a processing target area,
setting a reference point within the processing target area,
extracting a first area from the processing target area having a predetermined width separated from the reference point by half of the disparity to the left, and extracting a second area from the processing target area having the predetermined width separated from the reference point by half of the disparity to the right, wherein a variable range of the disparity corresponds to an operable range of the manipulation unit, and the disparity is set having a degree corresponding to an operable position within the operable range of the manipulation unit.

2. The image processing apparatus according to claim 1, wherein the manipulation unit includes a hardware button whose manipulation allocates the value to the depth direction or a software button displayed on a touch panel.

3. The image processing apparatus according to claim 1, wherein the circuitry is configured to:

obtain data on a panorama image by making a shot of a subject, and create data on the left-eye and right-eye images using the panorama image data obtained by the imaging unit.

4. The image processing apparatus according to claim 1, wherein the circuitry is configured to:

obtain data on a plurality of images by making shots of a subject at every constant interval while relatively moving in an approximately horizontal direction with respect to the subject in response to a single shot instruction, and create data on the left-eye and right-eye images using the data obtained on a plurality of images.

5. The image processing apparatus according to claim 1, wherein the circuitry is configured to:

set disparity between foreground objects synthesized with at least a part of areas of the left-eye and right-eye images as disparity between the left-eye and right-eye images, and create data on the left-eye image by synthesizing data on a foreground image where the foreground object is arranged in a predetermined position with data on a left-eye background image and creates data on the right-eye image by synthesizing data on the foreground image where the foreground object is arranged in a position displaced from the predetermined position by the disparity with data on a right-eye background image.

6. The image processing apparatus according to claim 1, wherein the image data is that of a single panoramic image.

7. The image processing apparatus according to claim 1, wherein a recommended depth of the 2D image is initially set as a default value.

8. The image processing apparatus according to claim 7, wherein the default value is displayed.

9. The image processing apparatus according to claim 1, wherein the 3D image creating unit is further configured to:

set another of the processing units as a second processing target area;

set a reference point within the second processing target area;

extract a first area from the second processing target area having the predetermined width separated from the reference point by half of the disparity to the left; and extract a second area from the second processing target area having the predetermined width separated from the reference point by half of the disparity to the right.

10. The image processing apparatus according to claim 9, wherein the 3D image creating unit is further configured to:

add the first area of the processing target area and the first area of the second processing target area to create the data on the left-eye image; and add the second area of the processing target to the second area of the second processing target to create the data on the right-eye image.

11. The image processing apparatus according to claim 9, wherein the second processing target area is adjacent to the processing target area in the image data.

12. The image processing apparatus according to claim 9, wherein the image data is that of a single panoramic image.

13. The image processing apparatus according to claim 12, wherein the second processing target area of the single panoramic image is adjacent to the processing target area of the single panoramic image.

14. An image processing method comprising the steps of:

setting disparity between left-eye and right-eye images for a 3D image based on a manipulation of a manipulation unit that allocates a value for a depth direction of a 2D image; and creating a 3D image by creating data on the left-eye and right-eye images in which a corresponding object is arranged in positions separated by the disparity set through the step of setting the disparity, the creating including obtaining image data, classifying the image data into a plurality of processing units, setting one of the processing units as a processing target area, setting a reference point within the processing target area, extracting a first area from the processing target area having a predetermined width separated from the reference point by half of the disparity to the left, and extracting a second area from the processing target area having the predetermined width separated from the reference point by half of the disparity to the right, wherein a variable range of the disparity corresponds to an operable range of the manipulation unit, and the disparity is set having a degree corresponding to an operable position within the operable range of the manipulation unit.

15. A non-transitory medium storing a program that causes a computer to execute a control process comprising the steps of:

setting disparity between left-eye and right-eye images for a 3D image based on a manipulation of a manipulation unit that allocates a value for a depth direction of a 2D image; and creating a 3D image by creating data on the left-eye and right-eye images in which a corresponding object is arranged in positions separated by the disparity set through the step of setting the disparity, the creating including obtaining image data, classifying the image data into a plurality of processing units, setting one of the processing units as a processing target area, setting a reference point within the processing target area, extracting a first area from the processing target area having a predetermined width separated from the reference point by half of the disparity to the left, and extracting a second area from the processing target area having the predetermined width separated from the reference point by half of the disparity to the right, wherein a variable range of the disparity corresponds to an operable range of the manipulation unit, and the disparity is set having a degree corresponding to an operable position within the operable range of the manipulation unit.

* * * * *